(12) United States Patent
Kanno

(10) Patent No.: US 11,853,200 B2
(45) Date of Patent: Dec. 26, 2023

(54) MEMORY SYSTEM AND CONTROLLER TO INVALIDATE DATA CORRESPONDING TO A LOGICAL ADDRESS

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/653,323

(22) Filed: Mar. 3, 2022

(65) Prior Publication Data
US 2022/0405199 A1 Dec. 22, 2022

(30) Foreign Application Priority Data
Jun. 21, 2021 (JP) .................................. 2021-102261

(51) Int. Cl.
*G06F 12/02* (2006.01)
*G06F 3/06* (2006.01)
*G06F 12/0891* (2016.01)

(52) U.S. Cl.
CPC ........ *G06F 12/0246* (2013.01); *G06F 3/0604* (2013.01); *G06F 3/0652* (2013.01); *G06F 3/0679* (2013.01); *G06F 12/0253* (2013.01); *G06F 12/0292* (2013.01); *G06F 12/0891* (2013.01); *G06F 2212/7201* (2013.01); *G06F 2212/7205* (2013.01); *G06F 2212/7209* (2013.01)

(58) Field of Classification Search
None
See application file for complete search history.

(56) References Cited

U.S. PATENT DOCUMENTS

| 8,397,107 | B1* | 3/2013 | Syu ..................... G06F 11/1012 714/770 |
| 9,715,447 | B2 | 7/2017 | Lin et al. |
| 9,983,799 | B2 | 5/2018 | Yeh |
| 10,489,289 | B1* | 11/2019 | Peterson ............... G06F 3/0652 |
| 2010/0217927 | A1* | 8/2010 | Song ..................... G06F 3/0656 711/E12.001 |
| 2012/0110249 | A1* | 5/2012 | Jeong .................... G06F 3/0652 711/E12.008 |
| 2013/0275660 | A1* | 10/2013 | Bennett ............... G06F 12/0246 711/103 |

(Continued)

FOREIGN PATENT DOCUMENTS

| EP | 2 965 208 B1 | 8/2019 |
| JP | 2018-116329 A | 7/2018 |

*Primary Examiner* — Nathan Sadler
(74) *Attorney, Agent, or Firm* — Oblon, McClelland, Maier & Neustadt, L.L.P.

(57) ABSTRACT

According to one embodiment, a controller writes a first data associated with a write request and a first logical address specified by the write request to a first block. The controller updates a logical-to-physical address translation table such that a first physical address indicating a first storage location in the first block in which the first data is written is associated with the first logical address. In response to receiving an invalidation request for invalidating the first data corresponding to the first logical address, the controller acquires, from the logical-to-physical address translation table, the first physical address, and updates a valid data identifier corresponding to a storage location indicated by the first physical address to a value indicating invalidation.

10 Claims, 29 Drawing Sheets

(56) References Cited

U.S. PATENT DOCUMENTS

| | | |
|---|---|---|
| 2017/0262176 A1 | 9/2017 | Kanno |
| 2018/0203637 A1 | 7/2018 | Furuya |
| 2019/0087089 A1* | 3/2019 | Yoshida ................ G06F 3/0658 |
| 2019/0129838 A1* | 5/2019 | Yoshida .................... G06F 3/06 |
| 2020/0057724 A1* | 2/2020 | Byun .................... G06F 3/0659 |
| 2021/0165734 A1* | 6/2021 | Chung ................. G06F 3/0604 |
| 2022/0011964 A1* | 1/2022 | Sasaki ................... G06F 3/0611 |
| 2022/0035700 A1* | 2/2022 | Schuh ................ G06F 11/1048 |

* cited by examiner

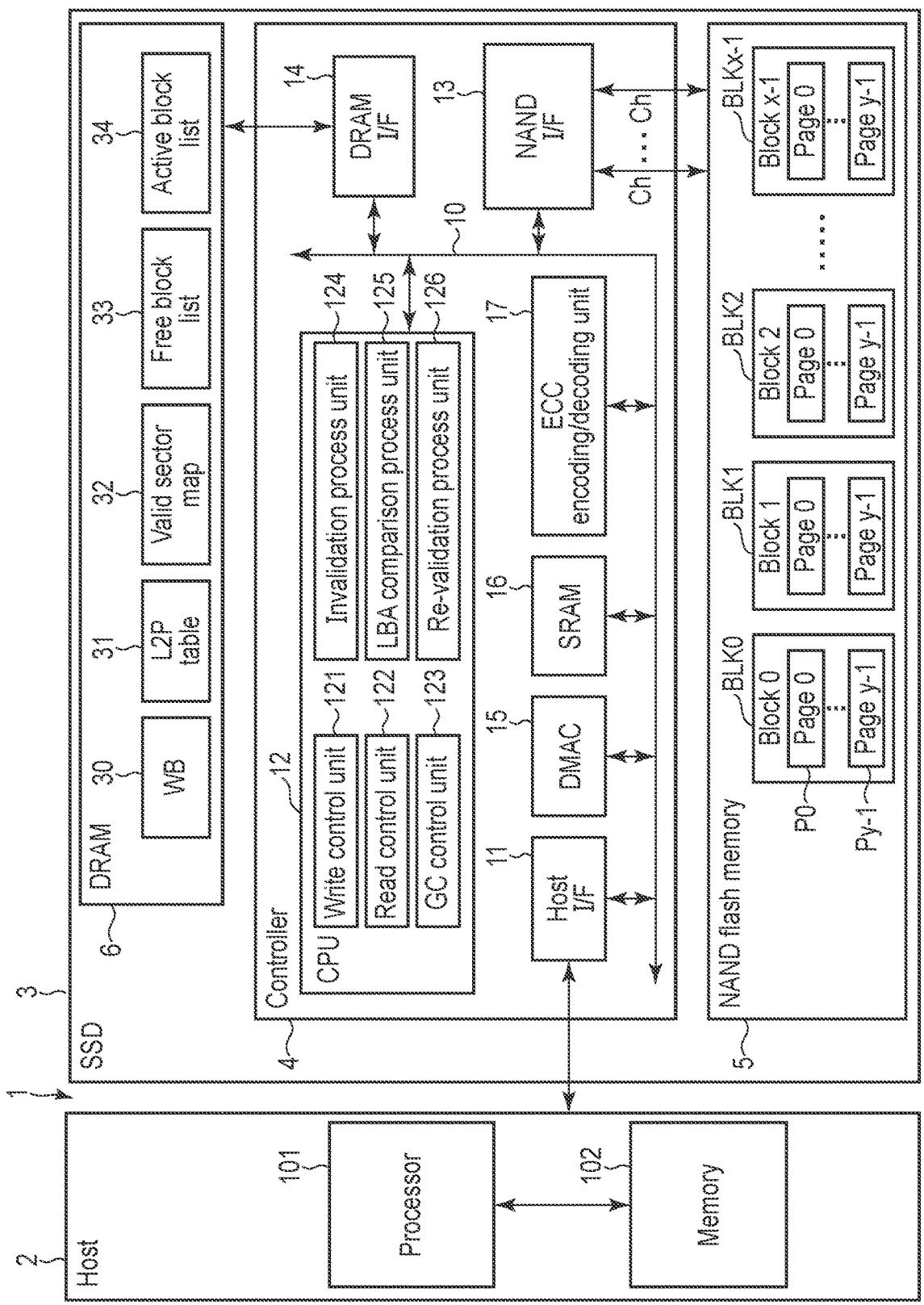
F I G. 1

F.I.G. 2

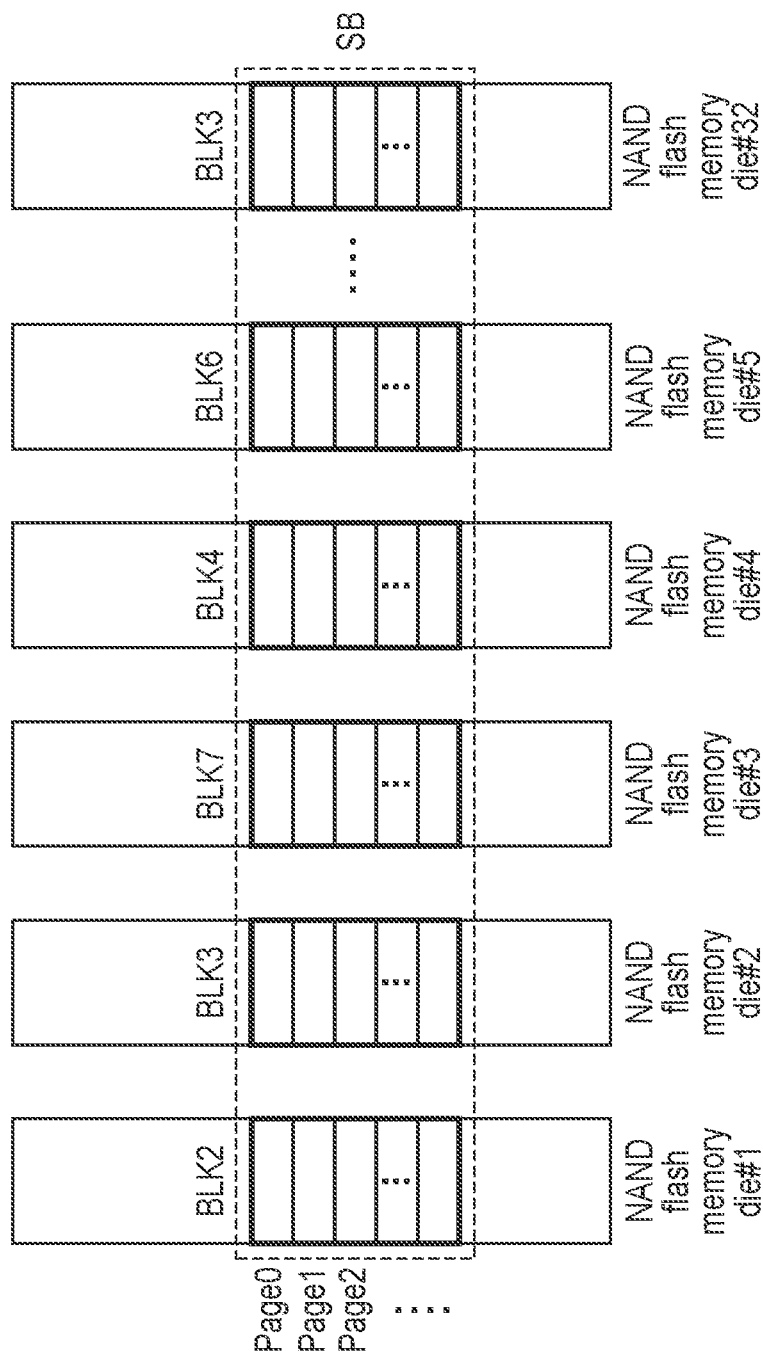
F I G. 3

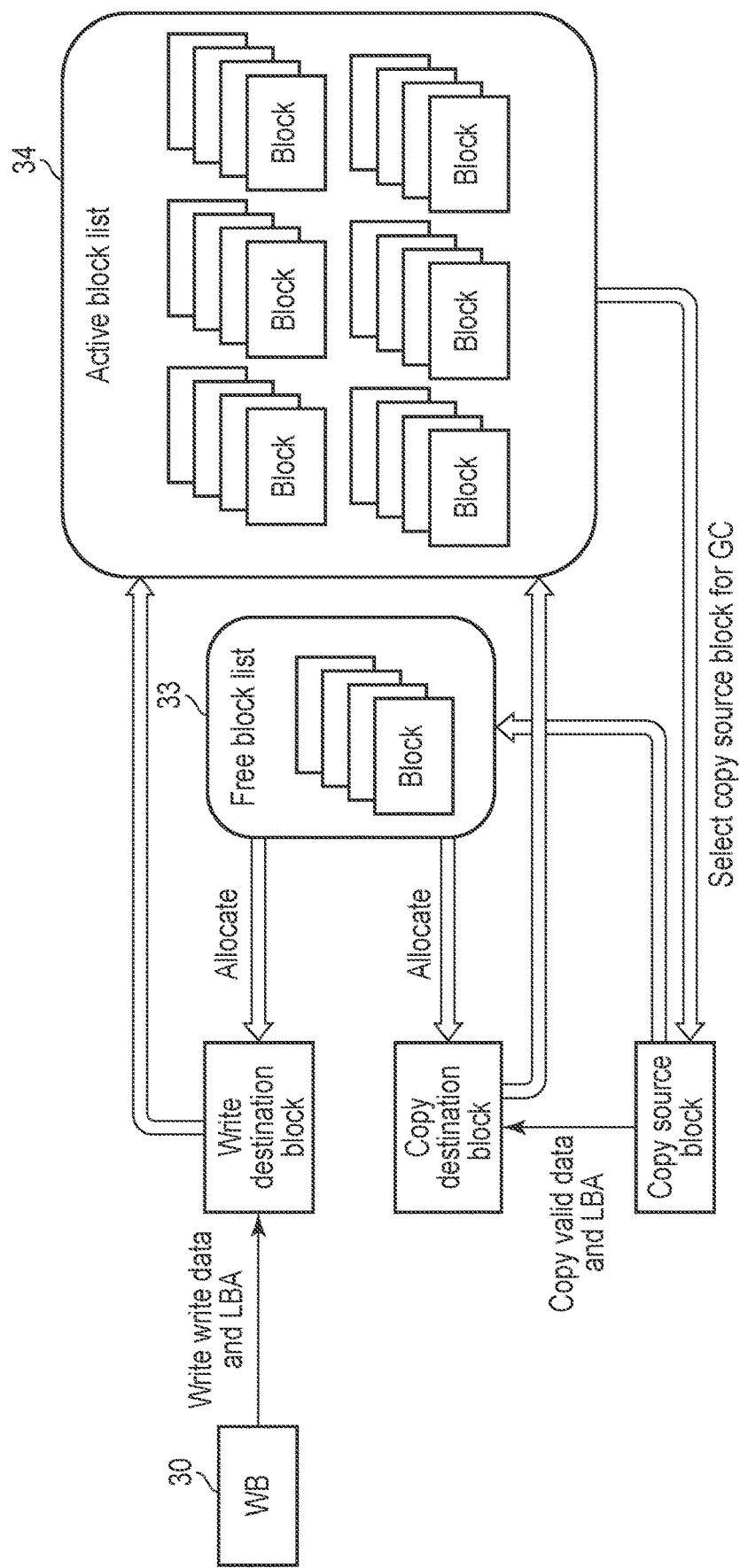
F I G. 10

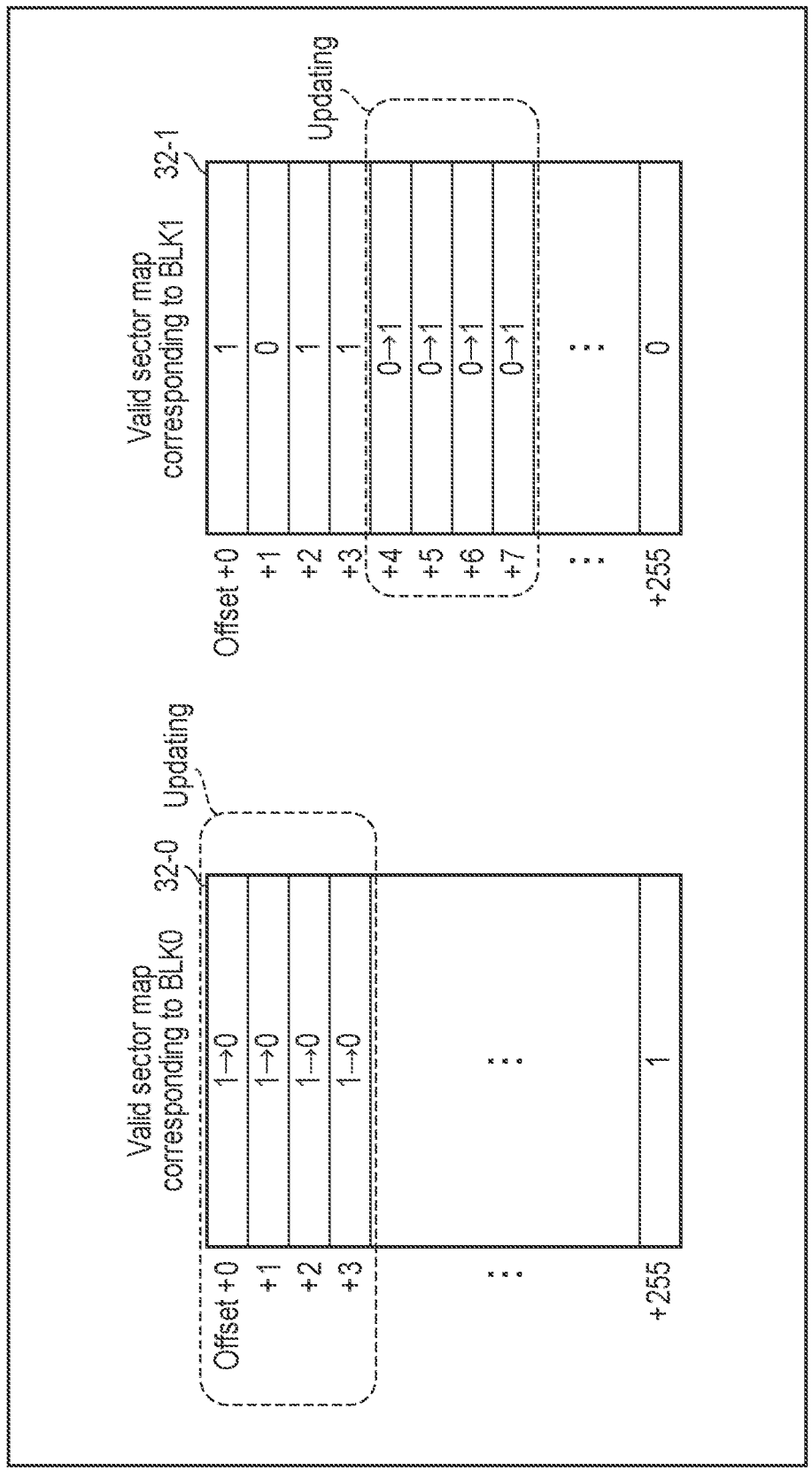
F I G. 16

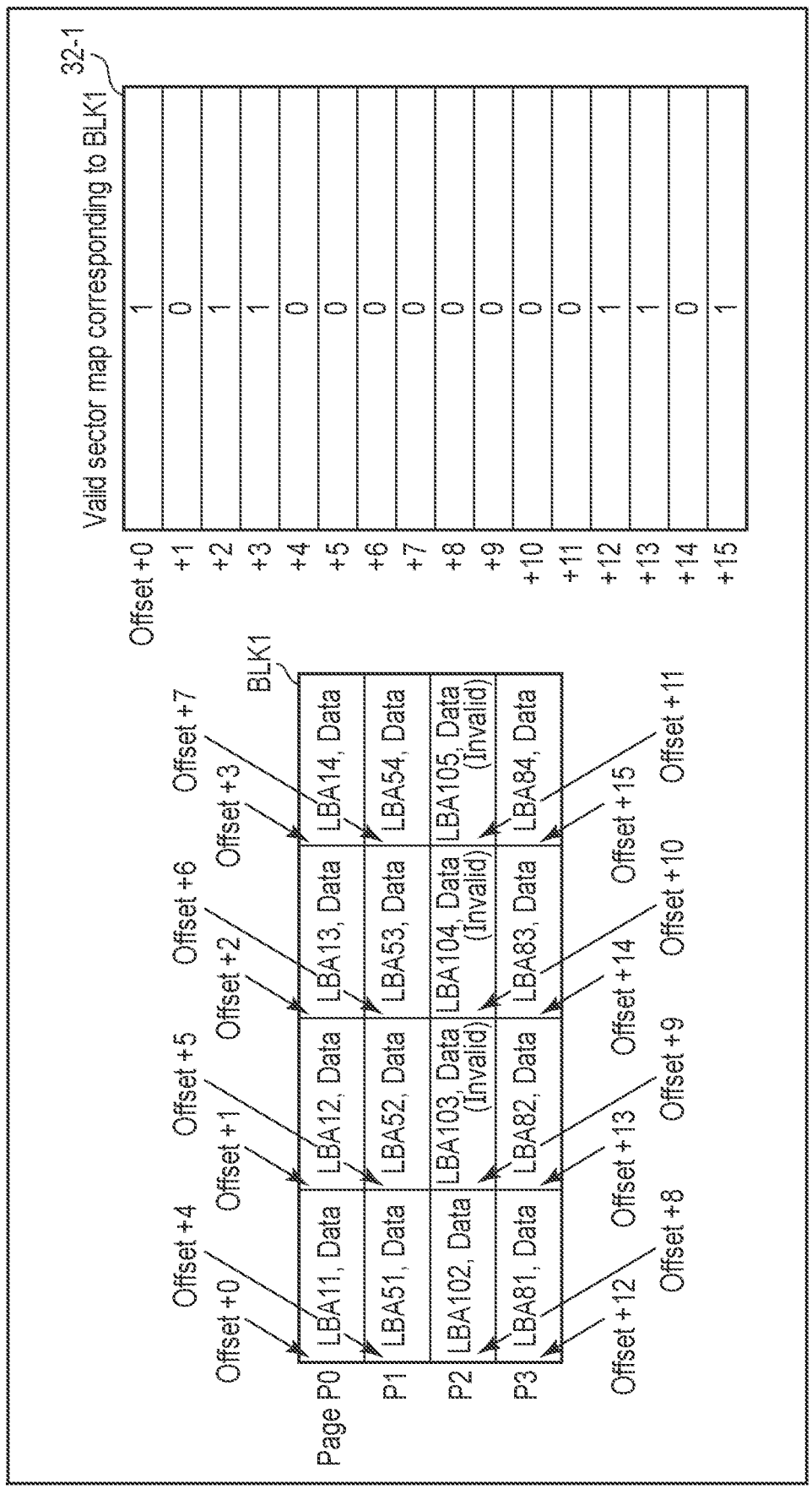
F I G. 18

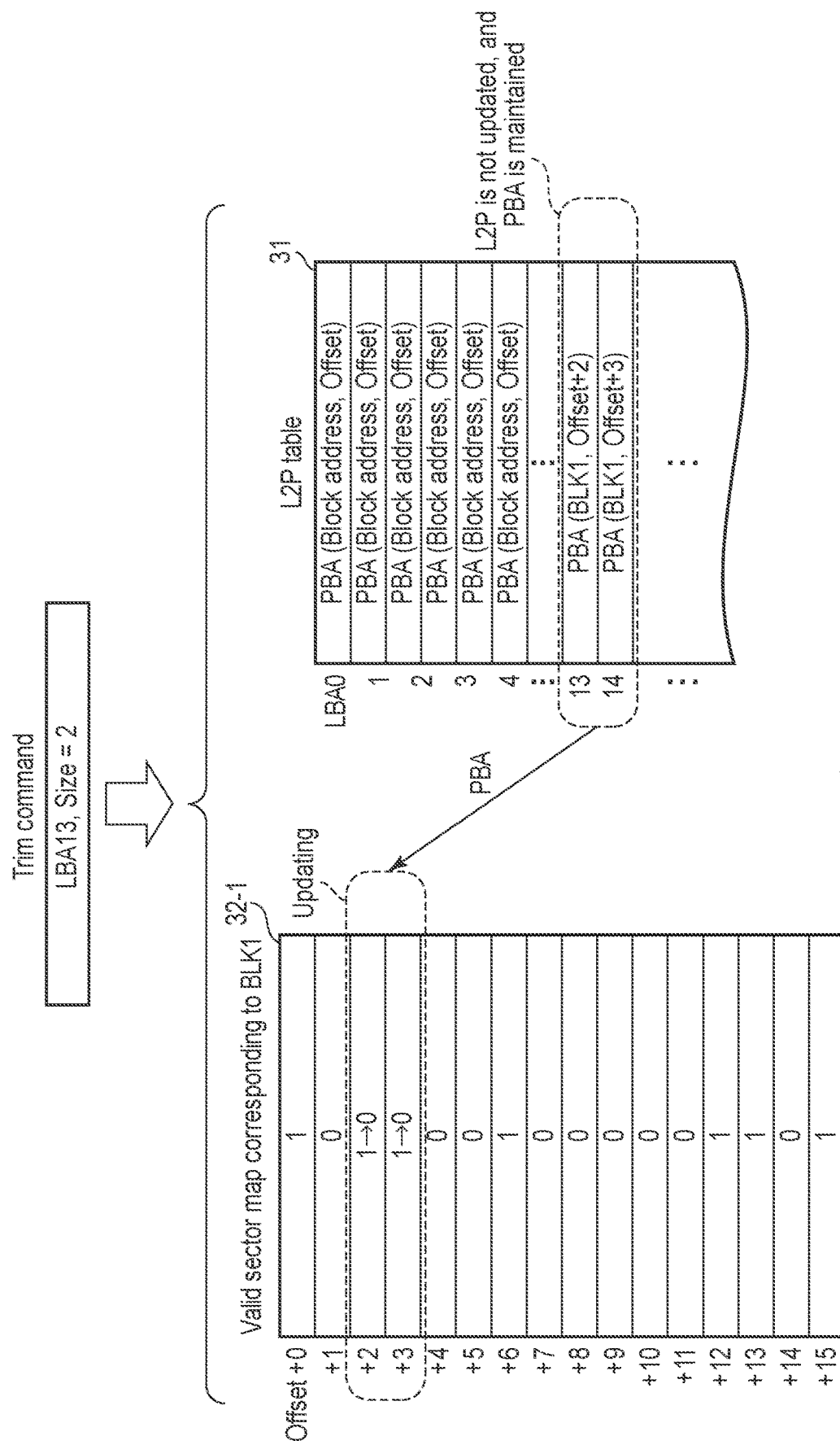
F I G. 19

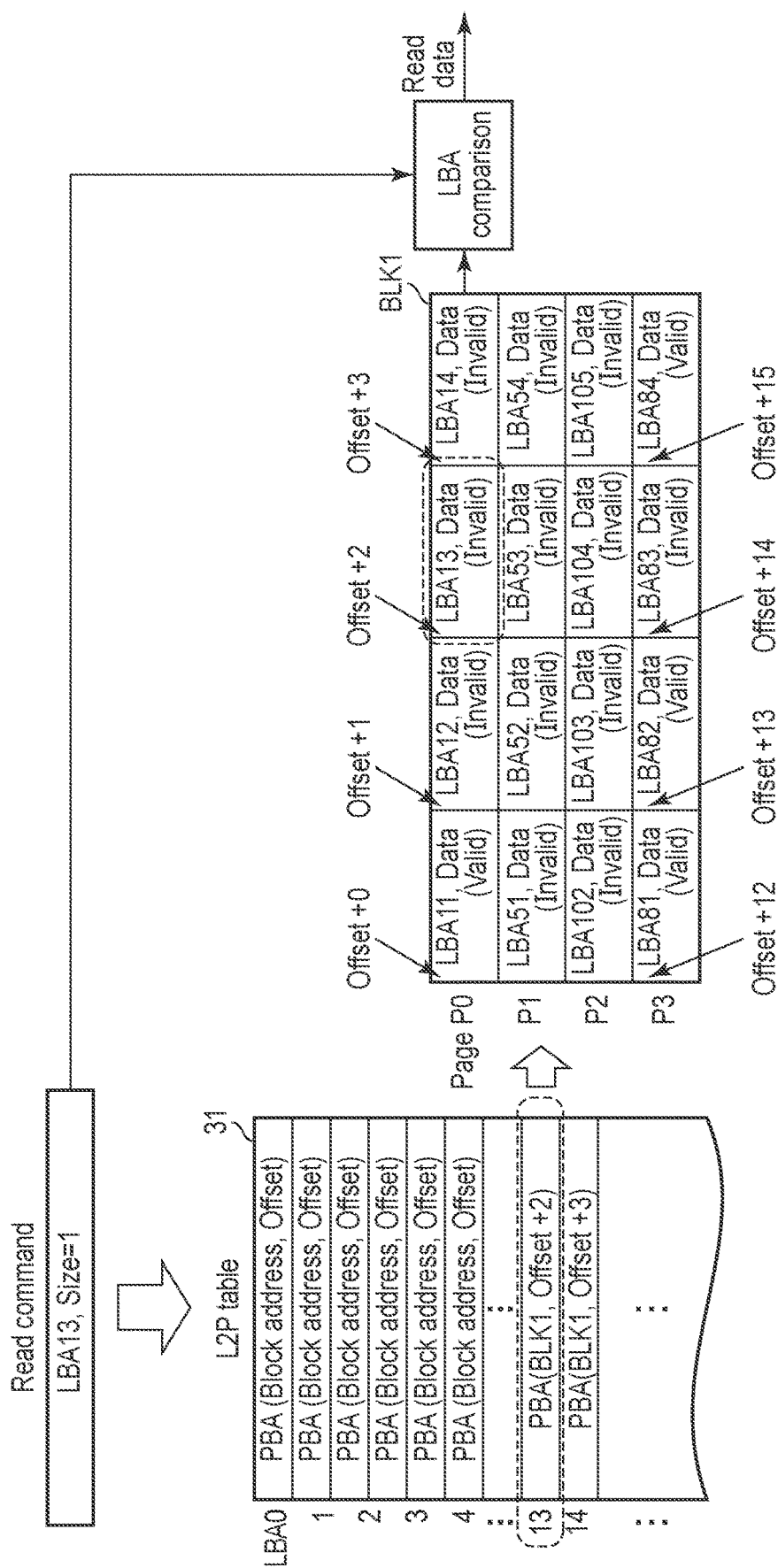
F I G. 20

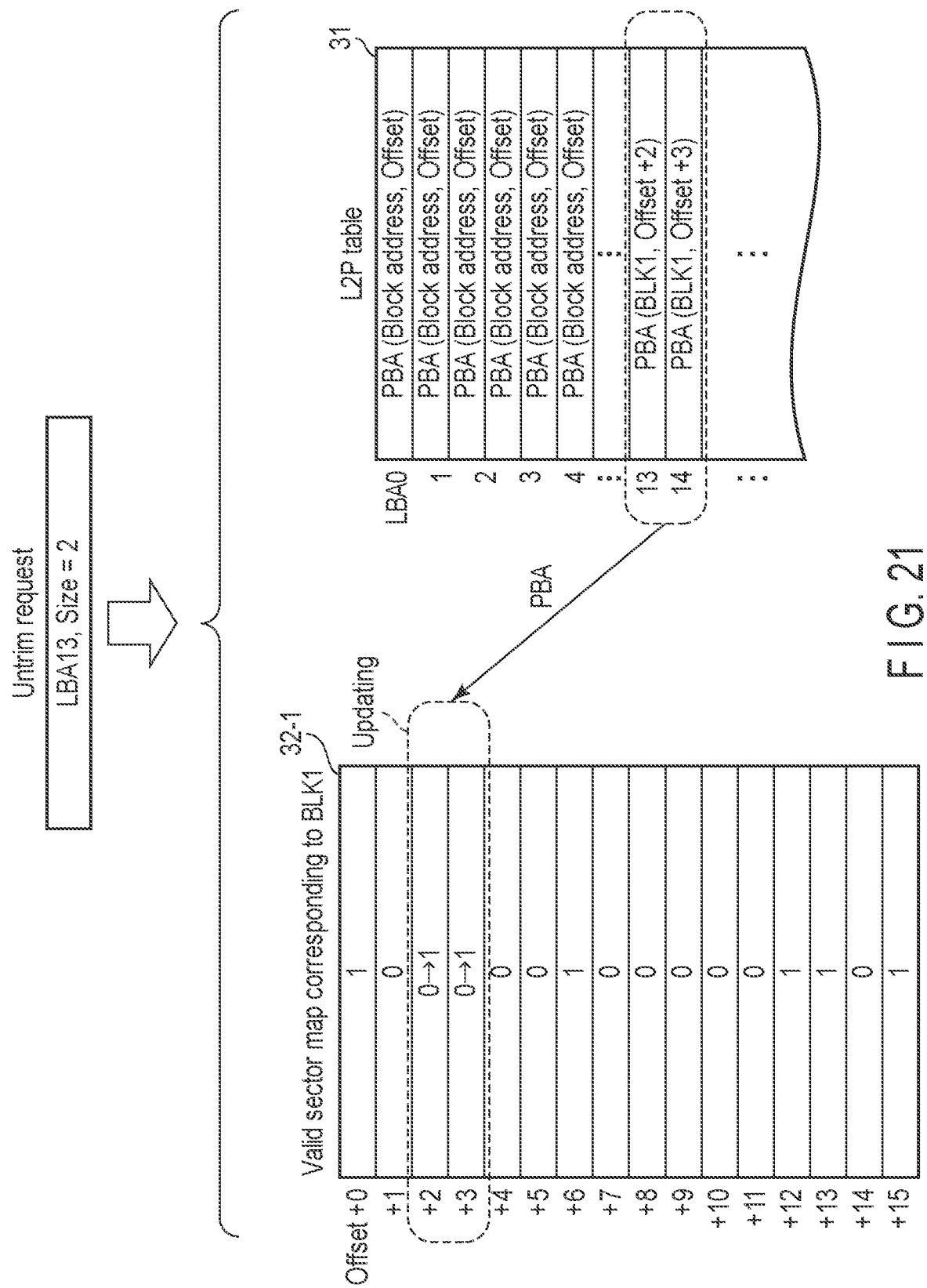
F I G. 21

| Data placement in BLK1 | | Valid sector map corresponding to BLK1 32-1 | Valid sector map corresponding to BLK1 32-1 | Valid sector map corresponding to BLK1 32-1 |
|---|---|---|---|---|
| LBA | Data | | | |
| Offset +0 LBA11 | Valid | 1 | 1 | 1 |
| +1 LBA12 | Invalid | 0 | 0 | 0 |
| +2 LBA13 | Valid | 1 | 0 | 1 |
| +3 LBA14 | Valid | 1 | 0 | 1 |
| ... | ... | ... | ... | ... |
| +12 LBA81 | Valid | 1 | 1 | 1 |
| +13 LBA82 | Valid | 1 | 1 | 1 |
| +14 LBA83 | Invalid | 0 | 0 | 0 |
| +15 LBA84 | Valid | 1 | 1 | 1 |
| | | | After Trim | After Untrim |

Copy only data corresponding to 1 in the case of GC

By executing Untrim command before GC, the state before executing Trim command can be recovered 1: Valid
0: Invalid

F I G. 22

| Valid sector map corresponding to BLK1 32-1 | | Valid sector map corresponding to BLK100 32-100 |
|---|---|---|
| Offset +0 | 1→0 | Offset +0 | 0→1 |
| +1 | 0 | +1 | 0→1 |
| +2 | 0 | +2 | 0→1 |
| +3 | 0 | +3 | 0→1 |
| +4 | 0 | +4 | 0 |
| +5 | 0 | +5 | 0 |
| +6 | 0 | +6 | 0 |
| +7 | 0 | +7 | 0 |
| +8 | 0 | +8 | 0 |
| +9 | 0 | +9 | 0 |
| +10 | 0 | +10 | 0 |
| +11 | 1→0 | +11 | 0 |
| +12 | 1→0 | +12 | 0 |
| +13 | 0 | +13 | 0 |
| +14 | 1→0 | +14 | 0 |
| +15 | | +15 | 0 |

F I G. 25

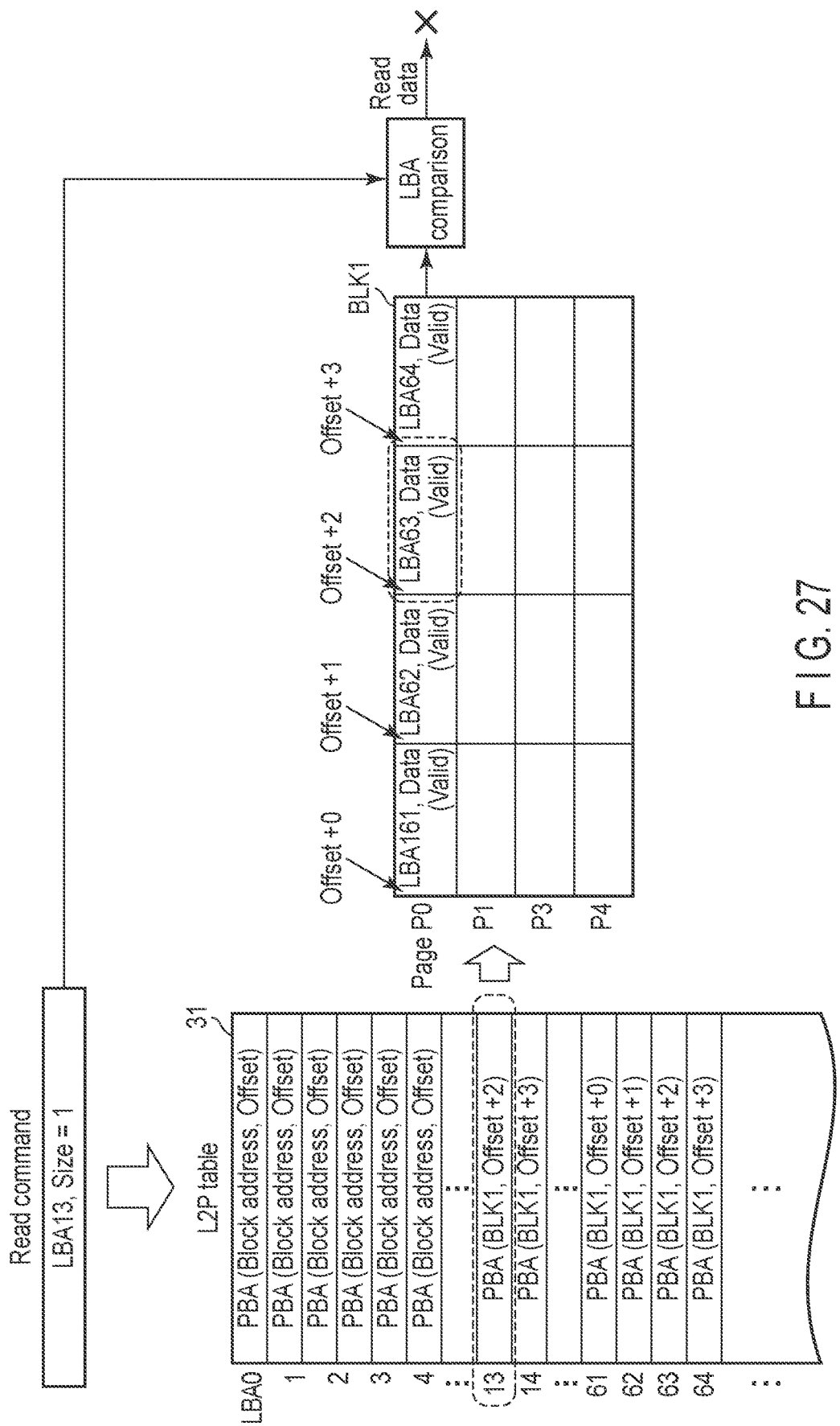
F I G. 27

MEMORY SYSTEM AND CONTROLLER TO INVALIDATE DATA CORRESPONDING TO A LOGICAL ADDRESS

CROSS-REFERENCE TO RELATED APPLICATIONS

This application is based upon and claims the benefit of priority from Japanese Patent Application No. 2021-102261, filed Jun. 21, 2021, the entire contents of which are incorporated herein by reference.

FIELD

Embodiments described herein relate generally to a technique for controlling a nonvolatile memory.

BACKGROUND

In recent years, a memory system implemented with a nonvolatile memory has been widely used. As one of such memory systems, a solid state drive (SSD) implemented with a NAND flash memory has been known.

In a memory system such as an SSD, a function of invalidating data corresponding to a logical address specified by an invalidation request issued by a host is used. This function is useful for reducing write amplification of the memory system.

Recently, it is desired to realize a new invalidation process that can deal with a case where a host erroneously issues an invalidation request.

BRIEF DESCRIPTION OF THE DRAWINGS

FIG. 1 is an illustrating block diagram illustrating an example of a configuration of an information processing system including a memory system and a host according to the embodiment.

FIG. 3 is a block diagram illustrating an example of a configuration of a super block used in the memory system according to the embodiment.

FIG. 10 is a diagram illustrating a data write operation and a garbage collection operation performed in the memory system according to the embodiment.

FIG. 16 is a diagram illustrating an operation of updating the valid sector map corresponding to the block to which the previous data is written and an operation of updating the valid sector map corresponding to the block in which the update data is written, which are performed according to the update data write operation illustrated in FIG. 14.

FIG. 18 is a diagram illustrating an example of the data placement in the block illustrated in FIG. 17 and a data structure of a valid sector map corresponding to the block illustrated in FIG. 17.

FIG. 19 is a diagram illustrating an invalidation process performed in the memory system according to the embodiment when an invalidation request (Trim command) specifying a certain logical address is received from a host.

FIG. 20 is a diagram illustrating a data read operation performed in the memory system according to the embodiment.

FIG. 21 is a diagram illustrating a re-validation process performed in the memory system according to the embodiment when a re-validation request (Untrim command) for re-validating data corresponding to a logical address specified by an invalidation request is received from a host.

FIG. 22 is a diagram illustrating the data placement in a certain block, a valid sector map corresponding to this block, content of the valid sector map after the invalidation request is processed, and content of the valid sector map after the re-validation request is processed.

FIG. 25 is a diagram illustrating an operation of updating a valid sector map corresponding to a copy source block and an operation of updating a valid sector map corresponding to a copy destination block performed in the garbage collection operation illustrated in FIG. 23.

FIG. 27 is a diagram illustrating an operation performed when a logical address read together with data from a storage location corresponding to a physical address acquired from a logical-to-physical address translation table does not match a logical address specified by a read request.

DETAILED DESCRIPTION

Figure 2:
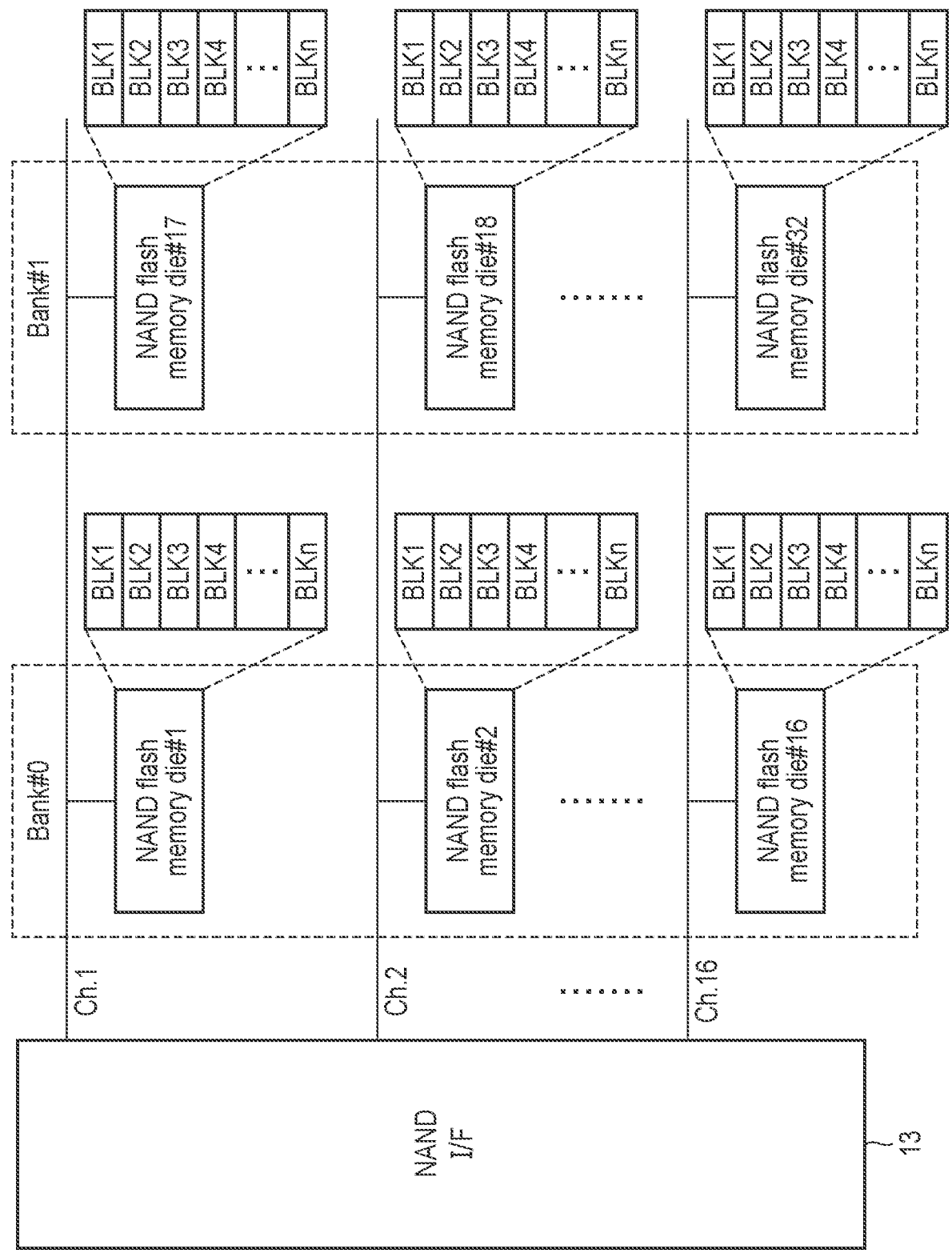
FIG. 2 is a block diagram illustrating an example of a relationship between a plurality of channels and a plurality of NAND flash memory dies used in the memory system according to the embodiment.

Various embodiments will be described hereinafter with reference to the accompanying drawings.

In general, according to one embodiment, a memory system connectable to a host includes a nonvolatile memory and a controller. The nonvolatile memory includes a plurality of blocks. The controller is configured to manage a plurality of valid data identifiers corresponding to a plurality of storage locations included in each of the plurality of blocks block by block using a management table. Each of the plurality of valid data identifiers indicating validity or invalidity of data stored in a corresponding storage location. In response to receiving from the host a write command specifying a first logical address, the controller writes both first data associated with the write request and the first logical address to a first block, updates a logical-to-physical address translation table such that a first physical address indicating a first storage location in the first block where the first data is written is associated with the first logical address, and updates a first valid data identifier in the management table corresponding to the first storage location in the first block to a value indicating validity. In response to receiving, from the host, an invalidation request to invalidate the first data corresponding to the first logical address, the controller acquires, from the logical-to-physical address translation table, the first physical address associated with the first logical address, and updates the first valid data identifier in the management table corresponding with the first storage location in the first block indicated by the acquired first physical address to a value indicating invalidity. When executing garbage collection of the nonvolatile memory, the controller selects a copy source block for garbage collection from the plurality of blocks, copies both valid data and a logical address corresponding with the valid data from the copy source block to a copy destination block, based on a plurality of second valid data identifiers in the management table corresponding to the plurality of storage locations in the copy source block. The controller updates the logical-to-physical address translation table such that a physical address indicating copy destination storage location in the copy destination block to which the valid data is copied is associated with the logical address of the valid data, updates a third valid data identifier in the management table corresponding with a copy source storage location in the copy source block where the valid data is stored to a value indicating validity, and updates a fourth valid data identifier in the management table corresponding to the copy destination storage location in the copy destination block to a value indicating validity.

First, a configuration of an information processing system including a memory system according to an embodiment will be described. FIG. 1 is a block diagram illustrating an example of configuration of an information processing system 1 including a memory system and a host according to an embodiment. Hereinafter, it is assumed that the memory system according to the embodiment is realized as a solid state drive (SSD) 3. The information processing system 1 includes a host (host device) 2 and the SSD 3.

The host 2 is an information processing apparatus that controls an operation of the SSD 3. Examples of information processing apparatuses include personal computers, server computers, and various other computing devices. The host 2 transmits a write request, which is a request for writing data, to the SSD 3. In addition, the host 2 transmits a read request, which is a request for reading data, to the SSD 3.

The host 2 includes a processor 101, the memory 102, and the like. The processor 101 is a central processing unit (CPU) configured to control an operation of each component in the host 2. The processor 101 executes software (host software) loaded from the SSD 3 or another storage device in the host 2 into the memory 102. The host software includes an operating system, a file system, a device driver, an application program, and the like.

The memory 102 is a main memory provided in the host 2. The memory 102 is a volatile semiconductor memory in which data stored is lost when power supply is stopped. The memory 102 is realized by, for example, a random access memory such as a dynamic random access memory (DRAM).

The SSD 3 is a semiconductor storage device configured to receive a write request and a read request which are transmitted from the host 2, and perform a data write operation and a data read operation for the nonvolatile memory based on the received write request and read request. The nonvolatile memory is a semiconductor memory device capable of holding data stored in the nonvolatile memory even after power supply is stopped. As the nonvolatile memory, for example, a NAND flash memory is used.

The SSD 3 can be connected to the host 2. The SSD 3 is built in the information processing apparatus, for example. The SSD 3 may be connected to the information processing apparatus via a cable or a network.

As a standard of a logical interface for connecting the host 2 and the SSD 3, for example, Serial Attached SCSI (SAS), Serial ATA (SATA), or NVM Express™ (NVMe™ standard) can be used.

The SSD 3 includes a controller 4 and a nonvolatile memory (for example, the NAND flash memory) 5. The SSD 3 may also include a random access memory, for example, a DRAM 6.

The controller 4 is a memory controller configured to control the NAND flash memory 5 which is an example of a non-volatile memory. The controller 4 may be realized by a circuit such as a system-on-a-chip (SoC). The controller 4 is electrically connected to the NAND flash memory 5 through a memory bus called a channel.

The NAND flash memory 5 includes a memory cell array. The memory cell array includes a plurality of memory cells disposed in a matrix. The memory cell array in the NAND flash memory 5 includes a plurality of blocks BLK0 to BLKx-1. Each of the blocks BLK0 to BLKx-1 is a unit for a data erasing operation for erasing data. Each of the blocks BLK0 to BLKx-1 is also referred to as a physical block or a flash block.

Each of the blocks BLK0 to BLKx-1 includes a plurality of pages (here, pages P0 to Py-1). Each page includes a plurality of memory cells connected to the same word line. Each of the pages P0 to Py-1 is a unit for a data write operation and a data read operation.

The NAND flash memory 5 may include a plurality of NAND flash memory dies (a plurality of NAND flash memory chips). Each NAND flash memory die may be a flash memory having a two-dimensional structure or a flash memory having a three-dimensional structure.

The DRAM 6 is a volatile semiconductor memory in which data stored in the DRAM 6 is lost when power supply is stopped. The DRAM 6 is used, for example, to temporarily store data to be written to the NAND flash memory 5. The storage region of the DRAM 6 is used to store various management data used by the controller 4.

Next, a detailed configuration of the controller 4 will be described.

The controller 4 includes a host interface (I/F) 11, a CPU 12, a NAND interface (I/F) 13, a DRAM interface (I/F) 14, a direct memory access controller (DMAC) 15, a static RAM (SRAM) 16, and an error correction code (ECC) encoding/decoding unit 17.

The host interface 11, the CPU 12, the NAND interface 13, the DRAM interface 14, the DMAC 15, the SRAM 16, and the ECC encoding/decoding unit 17 are interconnected via a bus 10.

The host interface 11 is a host interface circuit configured to perform communication with the host 2. The host interface 11 receives various commands (requests) from the host 2. These commands include a write command, a read command, a Trim command, an Untrim command, and the like.

The write command is a command (write request) that writes data (write data) to be written to the NAND flash memory 5. The write command includes, for example, a logical address (start logical block address: start LBA) indicating a first sector to which the write data is to be written, a data size of this write data, and a data pointer (buffer address) indicating a location in the memory 102 of the host 2 where this write data is stored.

The data size of the write data may be specified by, for example, the number of sectors (logical blocks). One sector corresponds to the minimum data size of the write data that can be specified by the host 2. Therefore, the data size of the write data is represented by a multiple of the sector.

In the present embodiment, the write data written to the NAND flash memory 5 according to the write command from the host 2 is also referred to as user data.

The read command is a command (read request) that reads data from the NAND flash memory 5. The read command includes a logical address (start LBA) indicating a first sector from which data (read target data) is to be read, a data size of the read target data, and a data pointer (buffer address) indicating a location in the memory 102 of the host 2 to which the data to be read is to be transferred.

The Trim command is a command (invalidation request) that requests invalidation of data corresponding to a certain logical address. The Trim command specifies a logical address of data to be invalidated. More specifically, the Trim command indicates a logical address (start LBA) indicating the first sector to be invalidated and the number of sectors to be invalidated (logical addresses). The Trim command may also be referred to as an Unmap command or a Deallocate command.

By using the Trim command, the host 2 can notify the SSD 3 of the logical address of unnecessary data (user data). With this notification, since the amount of data to be copied in the garbage collection can be reduced, the write amplification of the SSD 3 can be reduced.

The Untrim command is a new command (re-validation request) supported by the SSD 3 of the present embodiment. The Untrim command is used to cancel invalidation of data corresponding to a certain logical address and re-validate the data corresponding to this logical address. The Trim command indicates a logical address (start LBA) indicating the first sector to be re-validated and the number of sectors to be re-validated (logical addresses).

The CPU 12 is a processor configured to control the host interface 11, the NAND interface 13, the DRAM interface 14, the DMAC 15, the SRAM 16, and the ECC encoding/decoding unit 17.

The CPU 12 loads a control program (firmware) from the NAND flash memory 5 or a ROM (not illustrated) into the DRAM 6 according to the supply of power to the SSD 3. The CPU 12 can function as a flash translation layer (FTL) configured to perform data management and block management of the NAND flash memory 5 by executing the firmware. The data management performed by the FTL includes (1) management of mapping information indicating a correspondence relationship between each logical address and each physical address of the NAND flash memory 5, (2) a process for concealing a constraint (for example, read/write operation in units of pages and erasing operation in units of blocks) of the NAND flash memory 5, and the like.

The logical address is an address used by the host 2 to access the SSD 3. As the logical address, for example, an LBA is used. Management of mapping between each logical address used by the host 2 to access the SSD 3 and each physical address (physical block address, PBA) of the NAND flash memory 5 is executed using a logical-to-physical address translation table (L2P table) 31.

The CPU 12 manages mapping between each logical address and each physical address using the L2P table 31. A physical address corresponding to a certain logical address indicates a storage location (physical storage location) in the NAND flash memory 5 to which data corresponding to the logical address is written. For example, the L2P table 31 may be loaded from the NAND flash memory 5 to the DRAM 6 in response to supply of power to the SSD 3.

The L2P table 31 manages mapping between each logical address and each physical address PBA with a predetermined management size such as a sector. One sector corresponds to the minimum data size of the write data that can be specified by the host 2. The size of the sector (logical block) is, for example, 4 KiB. Data corresponding to a plurality of sectors may be stored in one page. The size of one page is, for example, 16 KiB.

Data management performed by the FTL also includes management of valid data and invalid data. The CPU 12 manages a plurality of valid data identifiers corresponding to a plurality of respective storage locations included in each of a plurality of blocks in the NAND flash memory 5 for each block using the management table.

Each of the plurality of valid data identifiers indicates validity or invalidity of the data stored in the corresponding storage location. The plurality of valid data identifiers corresponding to each block is referred to as a valid sector map 32. The valid sector map 32 corresponding to one block includes valid data identifiers whose number is as many as the number of a plurality of storage locations (sectors) included in one block. The block corresponding to one valid sector map 32 is, for example, a physical block.

Alternatively, the block corresponding to one valid sector map 32 may be a block group (that is, the super block) described later with reference to FIG. 3.

Each valid data identifier is represented by a 1-bit flag. Therefore, the valid sector map 32 is also referred to as bitmap data. Each valid data identifier is also referred to as a bitmap flag.

The valid data is the latest data associated with a certain logical address. When data corresponding to a certain logical address is written to the NAND flash memory 5, the data written to the NAND flash memory 5 is valid data.

In addition, when update data corresponding to a certain logical address is written to the NAND flash memory 5, the written data is valid data. The old data remaining in the NAND flash memory 5 is treated as invalid data. In addition, data corresponding to the logical address specified by the invalidation request from the host 2 is also treated as invalid data.

The block management performed by the FTL includes management of a bad block (defective block), wear leveling, and garbage collection.

The wear leveling is an operation for equalizing the number of rewrites (the number of program/erase cycles) of each block.

The garbage collection is an operation for reducing the number of blocks in which valid data and invalid data are mixed and increasing the number of free blocks. In the garbage collection, the CPU 12 selects a copy source block from blocks in which valid data and invalid data are mixed, and copies valid data stored in the copy source block to a copy destination block. When copying of all valid data in the copy source block is completed, the copy source block is released as a free block not including valid data, and can be reused that writes data.

As described above, data corresponding to the logical address specified by the invalidation request from the host 2 is treated as invalid data. Therefore, the invalidation request reduces the amount of data required to be copied in the garbage collection, thereby making it possible to reduce the write amplification of the SSD 3.

The block management performed by the FTL also includes management of free blocks and active blocks. The active block is a block in which valid data is stored. The CPU 12 manages each free block using a free block list 33. In addition, the CPU 12 manages each active block using active block list 34.

The NAND interface 13 is a memory control circuit configured to control the NAND flash memory 5 under the control of the CPU 12. The communication between the NAND interface 13 and the NAND flash memory 5 is performed in accordance with, for example, a Toggle NAND flash interface or an open NAND flash interface (ONFI).

The DRAM interface 14 is a DRAM control circuit configured to control the DRAM 6 under the control of the CPU 12. Part of the storage region of the DRAM 6 is used as a write buffer (WB) 30 for temporarily storing write data associated with one or more write requests received from the host 2. In addition, another part of the storage region of the DRAM 6 is used as a storage region for storing the L2P table 31, the valid sector map 32, the free block list 33, and the active block list 34.

The DMAC 15 executes data transfer between the memory 102 of the host 2 and the DRAM 6 (or the SRAM 16) under the control of the CPU 12. When the write data is to be transferred from the memory 102 of the host 2 to the write buffer (WB) 30, the CPU 12 specifies a transfer source address indicating a location in the memory 102 of the host 2, a size of the write data to be transferred, and a transfer destination address indicating a location in the write buffer (WB) 30 for the DMAC 15.

When data is to be written to the NAND flash memory 5, the ECC encoding/decoding unit 17 encodes the data to add an error correction code (ECC) as a redundant code to the data. When data is read from the NAND flash memory 5, the ECC encoding/decoding unit 17 performs error correction of this data using the ECC added to the read data.

Next, the invalidation process function according to the present embodiment will be described. The CPU 12 can function as a write control unit 121, a read control unit 122, a garbage collection (GC) control unit 123, an invalidation process unit 124, an LBA comparison process unit 125, and a re-validation process unit 126.

Part or all of the write control unit 121, the read control unit 122, the garbage collection (GC) control unit 123, the invalidation process unit 124, the LBA comparison process unit 125, and the re-validation process unit 126 may be realized by dedicated hardware in the controller 4.

In response to receiving the write request from the host 2, the write control unit 121 writes data (write data) associated with the received write request to the write destination block. The write destination block means a block allocated as a block used that writes data from the host 2. The write control unit 121 can write not only the write data but also both the write data and the LBA specified by the write request, to the write destination block.

In addition, the write control unit 121 updates the L2P table 31 so that the physical address PBA indicating the storage location in the write destination block where the write data is written is associated with the LBA specified by the write request. Further, the write control unit 121 updates the valid data identifier in the valid sector map 32 corresponding to the storage location in the write destination block where the write data is written to a value indicating validity.

In response to receiving the read request from the host 2, the read control unit 122 refers to the L2P table 31 to acquire the physical address PBA (=block identifier and offset) associated with the LBA specified by the read request from the L2P table 31. Then, based on the acquired physical address, the read control unit 122 reads both the data and the LBA corresponding to the data from the storage location in the block identified by the physical address. The LBA read together with the data is used to verify that the read data is data corresponding to the LBA specified by the read request.

When executing garbage collection for the NAND flash memory 5, the GC control unit 123 selects one or more copy source blocks (GC source blocks) for garbage collection from a plurality of blocks of the NAND flash memory 5. In the selection of the copy source block, for example, a GC policy of preferentially selecting an active block having the smallest valid data amount as a copy source block may be used, or another GC policy may be used. The copy source block is a block to be subjected to GC on which a garbage collection operation is performed.

The GC control unit 123 identifies valid data in the selected copy source block based on a plurality of valid data identifiers in the valid sector map 32 corresponding to a plurality of respective storage locations in the selected copy source block. Then, the GC control unit 123 copies both the valid data and the LBA corresponding to this valid data from the copy source block to a copy destination block (GC destination block) for the garbage collection operation.

The GC control unit 123 updates the L2P table 31 so that the physical address indicating the copy destination storage location in the copy destination block to which the valid data is copied is associated with the LBA corresponding to the copied valid data.

A pair of valid data and the LBA is stored in the copy source block. Therefore, the GC control unit 123 can easily identify the LBA corresponding to the valid data. As a result, the GC control unit 123 can easily associate the physical address indicating the copy destination storage location in the copy destination block to which the valid data is copied with the LBA corresponding to this valid data.

Further, the GC control unit 123 updates the valid data identifier in the valid sector map 32 corresponding to the copy source storage location in the copy source block where the valid data is stored to a value indicating invalidity. In addition, the GC control unit 123 updates the valid data identifier in the valid sector map 32 corresponding to the copy destination storage location in the copy destination block to a value indicating validity.

After copying of all the valid data in the copy source block and all the LBAs corresponding to all the valid data is completed, the copy source block is reusable for writing data. That is, when the garbage collection operation is performed on a certain block, this block becomes a free block. Therefore, the block subjected to the garbage collection operation will be reused as a write destination block.

In response to receiving a Trim command requesting invalidation of data corresponding to a certain logical address from the host 2, the invalidation process unit 124 refers to the L2P table 31 to acquire a physical address indicating a storage location where the data corresponding to the logical address is stored from the L2P table 31. Then, while maintaining the acquired physical address in the L2P table 31, the invalidation process unit 124 updates the valid data identifier in the valid sector map 32 corresponding to the storage location indicated by the acquired physical address to a value indicating invalidity.

As a result, the data stored in the storage location indicated by the acquired physical address is treated as invalid data. Therefore, in a case where the block including this storage location is selected as the copy source block for garbage collection, the data stored in this storage location can be excluded from the data to be copied, whereby the write amplification can be reduced.

In the L2P table 31, the physical address PBA corresponding to the LBA specified by the Trim command remains without being deleted. Therefore, even when the host 2 erroneously issues a Trim command specifying a certain LBA, the physical address PBA corresponding to the LBA specified by the Trim command can be acquired from the L2P table 31.

Therefore, even when a Trim command specifying a certain LBA is issued by the host 2, the data corresponding to this LBA can be read from the block before the garbage collection operation is performed on the block storing the data corresponding to this LBA and the block is reused as a new write destination block.

Therefore, the invalidation process of the present embodiment of updating only the valid sector map 32 without updating the L2P table 31 can enable reading of data corresponding to the logical address specified by the Trim command for a certain period of time while realizing an effect corresponding to the original purpose of the Trim command of reducing write amplification.

Here, the invalidation process according to the comparative example will be described.

When a Trim command specifying a certain LBA is received, in the invalidation process according to the comparative example, the physical address is deleted from the entry in the L2P table 31 corresponding to this LBA, and instead, the magic number indicating invalidation is stored in the entry.

The data corresponding to this LBA remains in the NAND flash memory 5. However, the physical address indicating the storage location where the data is stored is deleted. Therefore, in the invalidation process according to the comparative example, when the host 2 erroneously issues the Trim command, the data corresponding to the LBA specified by this Trim command can no longer be read from the SSD 3.

The LBA comparison process unit 125 compares the LBA together with the data read from the NAND flash memory 5 in response to the read request from the host 2 with the LBA specified by the read request.

For example, when a garbage collection operation is performed on a block in which data corresponding to an LBA specified by an already processed Trim command is stored and this block is reused as a new write destination block, there is a possibility that data corresponding to another LBA is newly written to a storage location in which this data is stored. Therefore, when a read request specifying the LBA specified by the Trim command already processed is issued from the host 2 after the garbage collection operation is performed on this block, there is a possibility that data corresponding to another LBA is read from this block.

In the present embodiment, it is possible to determine whether the data read from the NAND flash memory 5 is data corresponding to the LBA specified by the read request based on the result of the LBA comparison by the LBA comparison process unit 125. Therefore, it is possible to prevent data corresponding to another LBA different from the LBA specified by the read request from being transmitted to the host 2.

In response to receiving an Untrim command for re-validating data corresponding to a certain LBA from the host 2, the re-validation process unit 126 refers to the L2P table 31 to acquire the physical address associated with this LBA from the L2P table 31. Then, the re-validation process unit 126 updates the valid data identifier in the valid sector map 32 corresponding to the storage location indicated by the acquired physical address to a value indicating validity. As a result, the invalidation of the data corresponding to the LBA can be canceled, and the data corresponding to the LBA can be validated again.

In the present embodiment, the LBA comparison by the LBA comparison process unit 125 is also performed at the time of receiving the Untrim command. As a result, even in a case where the Untrim command specifying the LBA specified by the Trim command that has already been processed is issued from the host 2 after the garbage collection operation is performed on the block storing the data corresponding to the LBA specified by the Trim command that has already been processed, it is possible to prevent the data corresponding to the LBA different from the LBA specified by the Untrim command from being erroneously validated.

Next, a configuration of the NAND flash memory 5 including a plurality of NAND flash memory dies will be described. FIG. 2 is a block diagram illustrating an example of a relationship between a plurality of channels and a plurality of NAND flash memory dies used in the memory system according to the embodiment.

Each of the plurality of NAND flash memory dies can operate independently. Therefore, the NAND flash memory die is treated as a unit that can operate in parallel. FIG. 2 illustrates a case where 16 channels Ch. 1 to Ch. 16 are connected to the NAND interface (I/F) 13, and two NAND flash memory dies are connected to each of the 16 channels Ch. 1 to Ch. 16.

In this case, the 16 NAND flash memory dies #1 to #16 connected to the channels Ch. 1 to Ch. 16 may be configured as the bank #0, and the remaining 16 NAND flash memory dies #17 to #32 connected to the channels Ch. 1 to Ch. 16 may be configured as the bank #1. The bank is treated as a unit for operating a plurality of memory dies in parallel by bank interleaving. In the example of configuration of FIG. 2, up to 32 NAND flash memory dies can be operated in parallel by 16 channels and bank interleaving using two banks.

The erasing operation may be performed in units of one block (physical block) or in units of a block group including a set of a plurality of physical blocks that can operate in parallel. The block group is also referred to as a super block.

One block group, that is, one super block including a set of a plurality of physical blocks is not limited thereto, but may include a total of 32 physical blocks selected one by one from the NAND flash memory dies #1 to #32. Note that each of the NAND flash memory dies #1 to #32 may have a multi-plane configuration. For example, when each of the NAND flash memory dies #1 to #32 has a multi-plane configuration including two planes, one super block may include a total of 64 physical blocks selected one by one from 64 planes corresponding to the NAND flash memory dies #1 to #32.

FIG. 3 illustrates one super block (SB) including 32 physical blocks (here, the physical block BLK2 in the NAND flash memory die #1, the physical block BLK3 in the NAND flash memory die #2, the physical block BLK7 in the NAND flash memory die #3, the physical block BLK4 in the NAND flash memory die #4, the physical block BLK6 in the NAND flash memory die #5, . . . , and the physical block BLK3 in the NAND flash memory die #32).

Note that a configuration in which one super block includes only one physical block may be used, and in this case, one super block is equivalent to one physical block.

Figure 4:
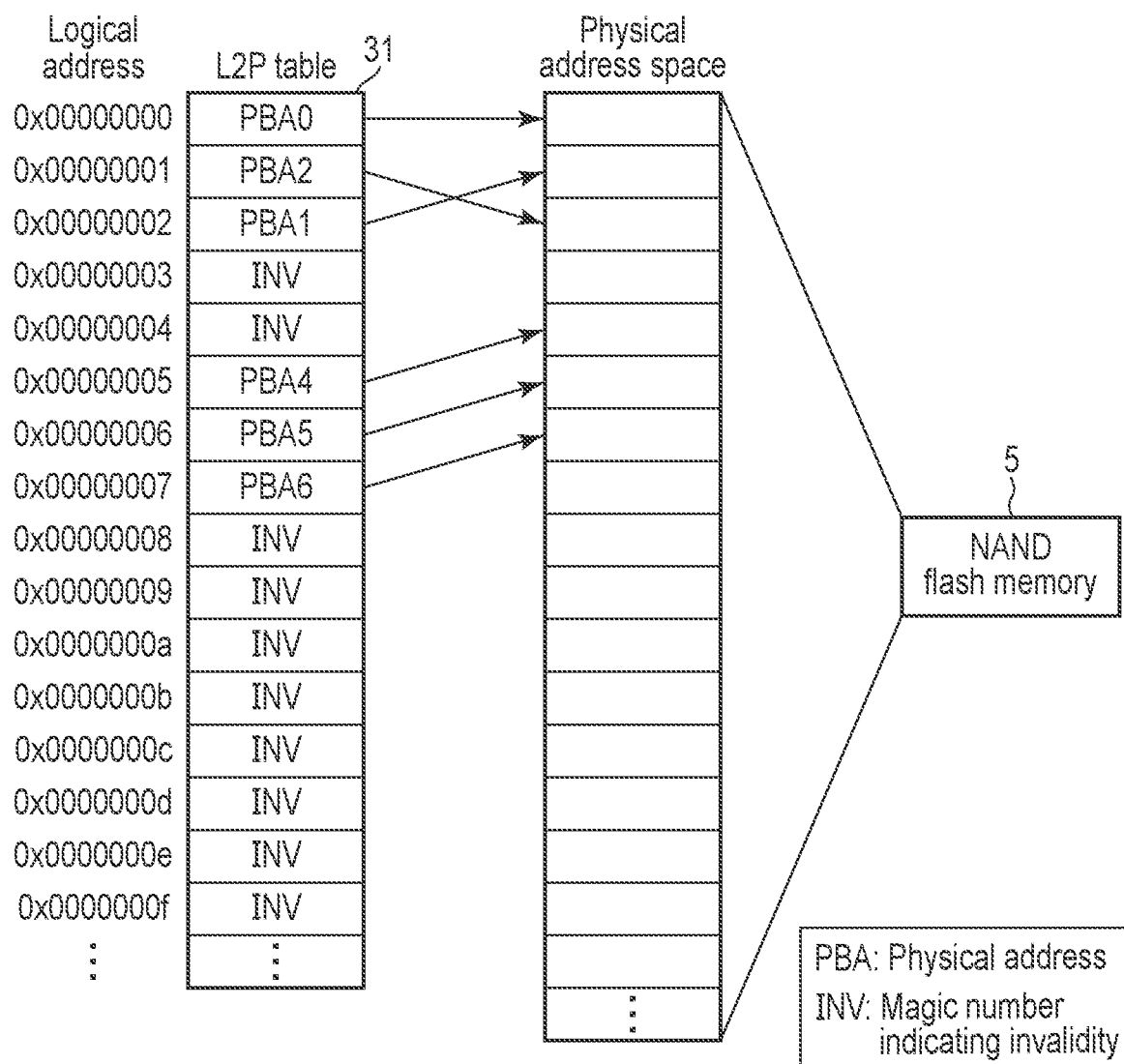
FIG. 4 is a diagram illustrating an example of a configuration of a logical-to-physical address translation table used in the memory system according to the embodiment.

Next, the L2P table 31 according to the present embodiment will be described. FIG. 4 is a diagram illustrating a configuration example of the L2P table 31 used in the SSD 3 according to the embodiment.

The L2P table 31 includes a plurality of entries corresponding to a plurality of logical addresses. In an entry corresponding to a certain logical address, a physical address PBA associated with this logical address is stored. For example, when the controller 4 writes data corresponding to a certain logical address to a certain storage location in the NAND flash memory 5, the controller 4 updates the L2P table 31 and associates the physical address PBA indicating this storage location with this logical address.

FIG. 4 illustrates a case where physical addresses PBA0, PBA2, PBA1, PBA4, PBA5, and PBA6 are respectively associated with logical addresses 0x00000000, 0x00000001, 0x00000002, 0x00000005, 0x00000006, and 0x00000007.

When data corresponding to a certain logical address is not written to the NAND flash memory 5, a magic number (INV) which is a specific value indicating invalidity (unallocated) may be stored in an entry corresponding to this logical address.

The physical address PBA indicating each storage location in the NAND flash memory 5 is represented by a combination of a block identifier and an offset in the block. The block identifier is an identifier that can uniquely specify each block. An offset corresponding to a storage location in a certain block indicates an offset value from the head of the block to this storage location.

In the NAND flash memory 5, writing to a page can be performed only once per erase cycle (program/erase cycle) of a block including the page. That is, new data cannot be directly overwritten on a region in a block to which data has already been written.

Therefore, in a case where the already-written data is updated, the controller 4 writes new data in the unwritten region in the block (or another block), and treats the previous data as invalid data. In other words, the controller 4 writes update data corresponding to a certain logical address not to a storage location where previous data corresponding to this logical address is stored but to a different storage location. Then, the controller 4 updates the L2P table 31 and associates the physical address indicating this different storage location with this logical address.

Figure 5:
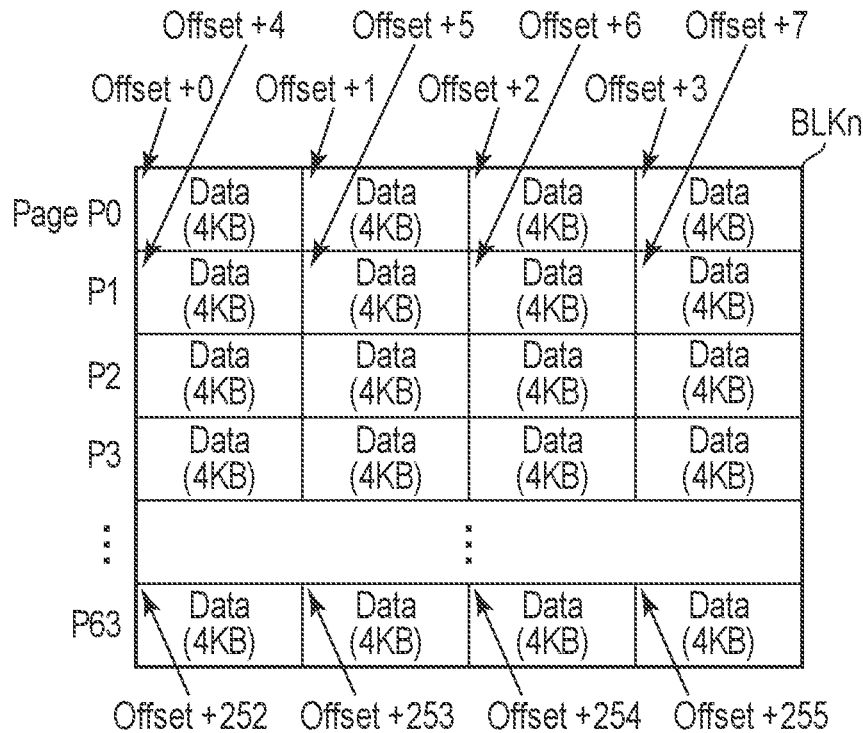
FIG. 5 is a diagram illustrating an example of a relationship between each of a plurality of storage locations in each block and each of a plurality of physical addresses in the memory system according to the embodiment.

Next, a plurality of physical addresses in the NAND flash memory 5 will be described. FIG. 5 is a diagram illustrating an example of a relationship between each of a plurality of storage locations in each block and each of a plurality of physical addresses in the SSD 3 according to the embodiment.

As described above, the physical address of each storage location included in the block is represented by a combination of the block identifier of this block and the offset corresponding to this storage location. FIG. 5 illustrates a plurality of storage locations included in any one block (here, the block BLKn) in the NAND flash memory 5. The block identifier of the block BLKn is a BLKn. The block BLKn includes a plurality of pages (for example, pages 0 to 63).

When the size of each of pages 0 to 63 is 16 KiB and the size of the sector is 4 KiB, the block BLKn is logically divided into 256 (=4×64) storage locations each having a size of 4 KiB.

The offset+0 indicates the first storage location in the page P0, the offset+1 indicates the second storage location in the page P0, the offset+2 indicates the third storage location in the page P0, and the offset+3 indicates the fourth storage location in the page P0.

The offset+4 indicates the first storage location in the page P1, the offset+5 indicates the second storage location in the page P1, the offset+6 indicates the third storage location in the page P1, and the offset+7 indicates the fourth storage location in the page P1.

Then, the offset+252 indicates the first storage location in the page P63, the offset+253 indicates the second storage location in the page P63, the offset+254 indicates the third storage location in the page P63, and the offset+255 indicates the fourth storage location in the page P63.

For example, the physical address of the first storage location in the page P0 is represented by a combination of the block identifier BLKn and the offset+0.

Figure 6:
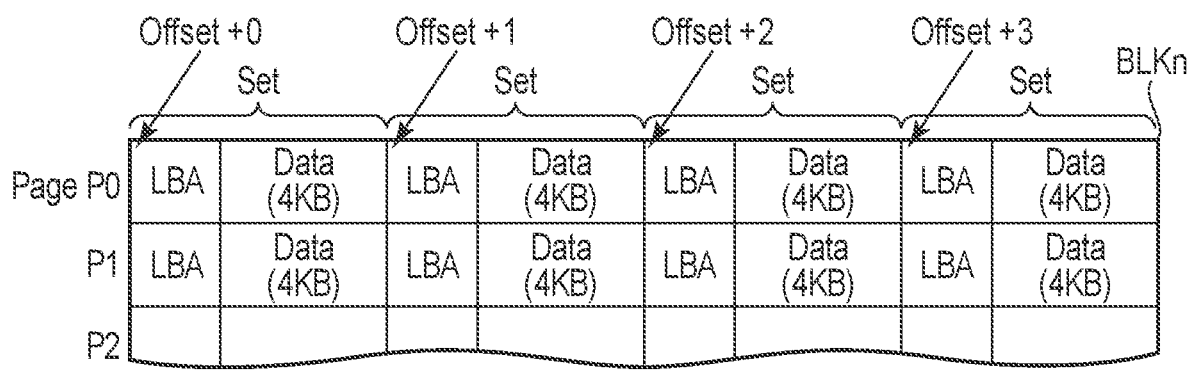
FIG. 6 is a diagram illustrating an example of an operation of writing a pair of a logical address and data to a block performed in the memory system according to the embodiment.
Figure 7:
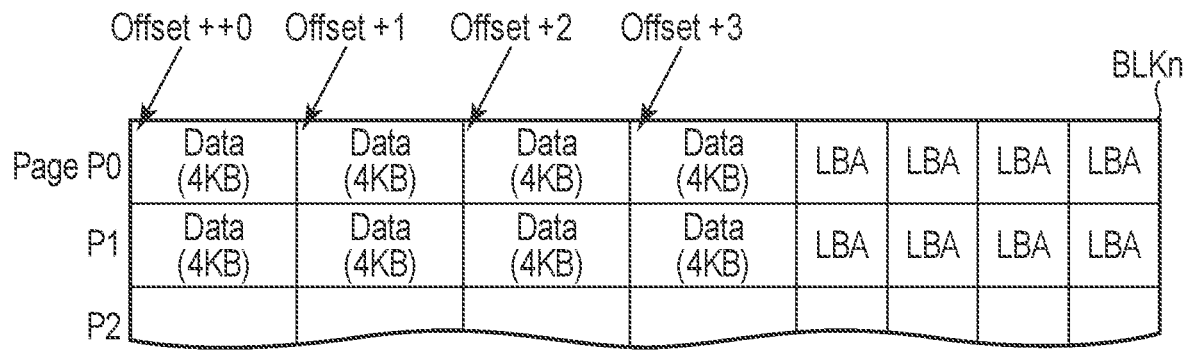
FIG. 7 is a diagram illustrating another example of an operation of writing a pair of a logical address and data to a block performed in the memory system according to the embodiment.

Next, an operation of writing the write data to the block together with the logical address (LBA) of the write data will be described. FIGS. 6 and 7 are diagrams illustrating an example of an operation of writing a pair of a logical address and data to a block, which is performed in the SSD 3 according to the embodiment.

In each block, each page may include a user data region for storing user data and a redundant region for storing management data. The page size is 16 KiB+alpha.

The controller 4 writes both the 4 KiB user data and the logical address (LBA) corresponding to the 4 KiB user data to the write destination block (here, the block BLKn). In this case, as illustrated in FIG. 6, four datasets, each including an LBA and 4 KiB user data, may be written to the same page. Each offset may indicate a set boundary.

Alternatively, as illustrated in FIG. 7, four pieces of 4 KiB user data may be written to a user data region in the page, and four LBAs corresponding to the four pieces of 4 KiB user data may be written to a redundant region in the page.

Figure 8:
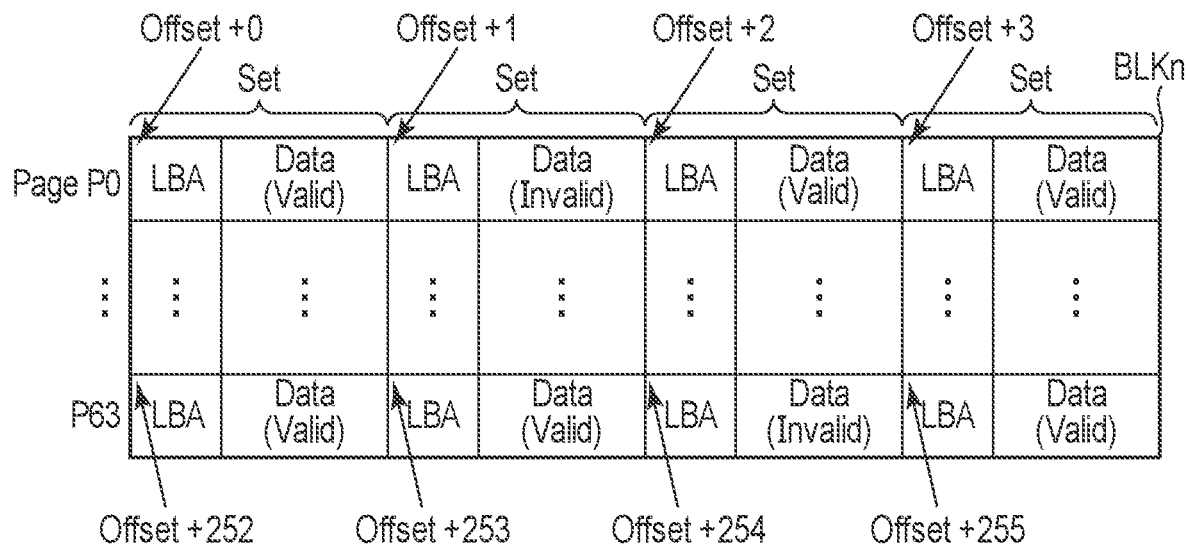
FIG. 8 is a diagram illustrating a state of a block to which data is written at all storage locations.

Next, an example of configuration of the valid sector map 32 will be described. Here, it is assumed that the valid sector map 32 is configured a plurality of valid sector maps corresponding to a plurality of respective blocks. As illustrated in FIG. 8, it is assumed that data is stored in all storage locations in the block BLKn. At the four storage locations in the page P0 of one block BLKn corresponding to one valid sector map, valid data, invalid data, valid data, and valid data are stored in this order. At the four storage locations in the page P63 of the block BLKn, valid data, valid data, invalid data, and valid data are stored in this order.

Figure 9:
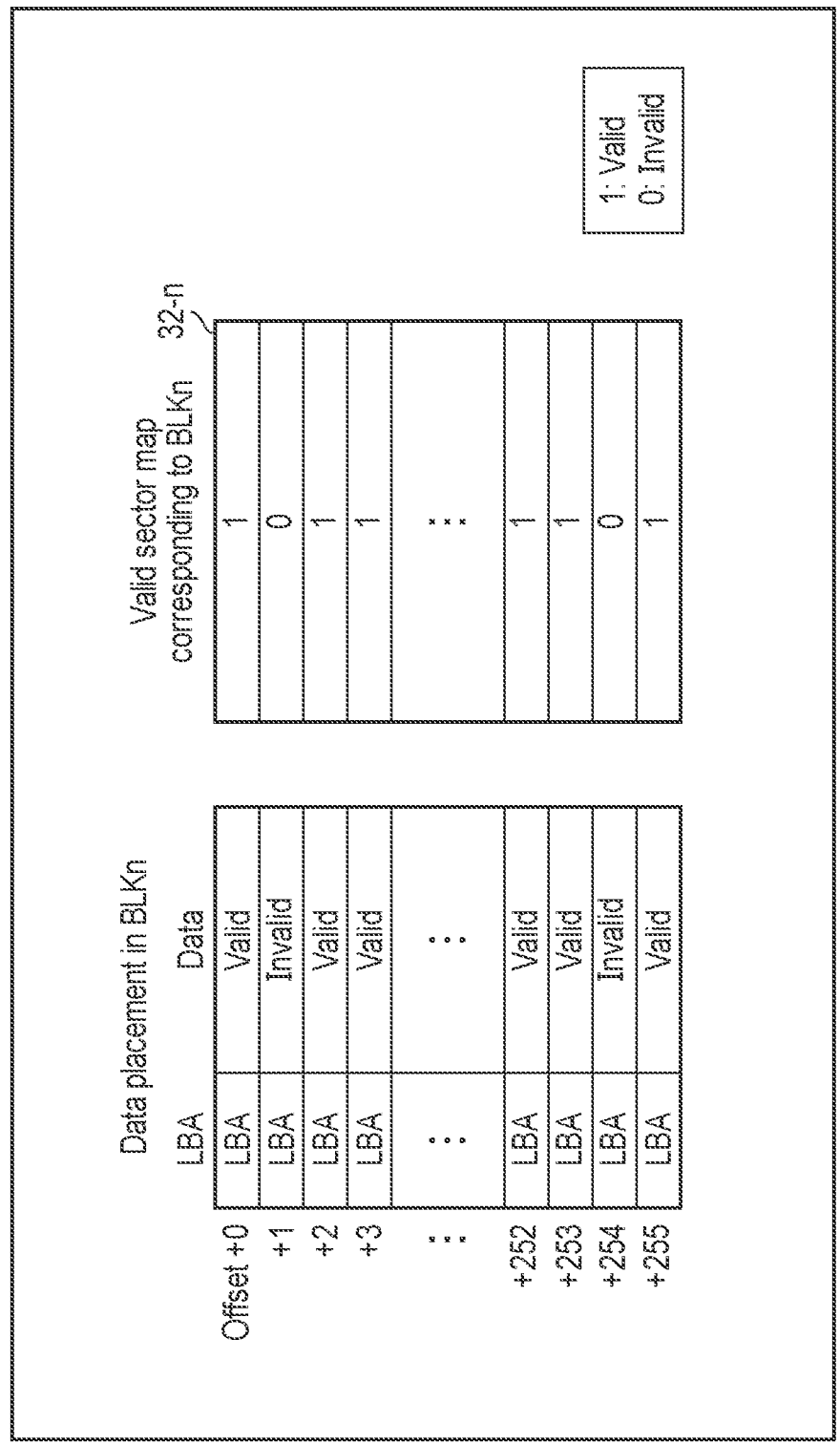
FIG. 9 is a diagram illustrating the data placement at a plurality of pieces of data storage locations in the block of FIG. 8 and a valid sector map corresponding to the block of FIG. 8.

FIG. 9 is a diagram illustrating the data placement at a plurality of storage locations in the block BLKn of FIG. 8 and a valid sector map 32-*n* corresponding to the block BLKn of FIG. 8.

The valid sector map 32-*n* includes 256 valid data identifiers corresponding to 256 respective storage locations in the block BLKn, that is, 256 bit bitmap flags (1011, . . . , 1101).

Here, a valid data identifier of "1" indicates that the data stored in the storage location corresponding to this valid data identifier is valid data. A valid data identifier of "0" indicates that the data stored in the storage location corresponding to this valid data identifier is invalid data.

Next, the data write operation and the garbage collection operation will be described. FIG. 10 is a diagram illustrating a data write operation and a garbage collection operation executed in the SSD 3 according to the embodiment.

The plurality of blocks included in the NAND flash memory 5 is roughly divided into a free block not including valid data and an active block including valid data. Each free block is managed by the free block list 33. Each active block is managed by the active block list 34.

First, one free block is selected from free block list 33. The selected free block is allocated as a write destination block after the erasing operation is performed. In the case where the write destination block is already allocated, the operation of allocating the free block as the write destination block is unnecessary.

The write data stored in the write buffer (WB) 30 together with the LBA corresponding to the write data is written to the write destination block.

When the entire write destination block is filled with data, this write destination block is managed by the active block list 34. Then, one free block is selected again from the free block list 33. The selected free block is allocated as a new write destination block after the erasing operation is performed.

When the garbage collection operation of the NAND flash memory 5 is executed, one free block is selected from the free block list 33. The selected free block is allocated as a copy destination block after the erasing operation is performed. When the copy destination block is already allocated, the operation of allocating the free block as the copy destination block is unnecessary.

In addition, a copy source block is selected from active blocks in the active block list 34. Then, the valid data and the LBA corresponding to the valid data are copied from the copy source block to the copy destination block based on the valid sector map corresponding to the selected copy source block. In this case, the valid data and the LBA corresponding to this valid data are read from the copy source block, and the read valid data and the read LBA are written to the copy destination block.

When copying of all the valid data in the copy source block and all the LBAs corresponding to all the valid data is completed, the copy source block is managed as a free block by the free block list 33. Then, the copy source block that has become a free block can be reused for writing data.

In addition, when the entire copy destination block is filled with data, this copy destination block is managed as an active block by the active block list 34.

Figure 11:
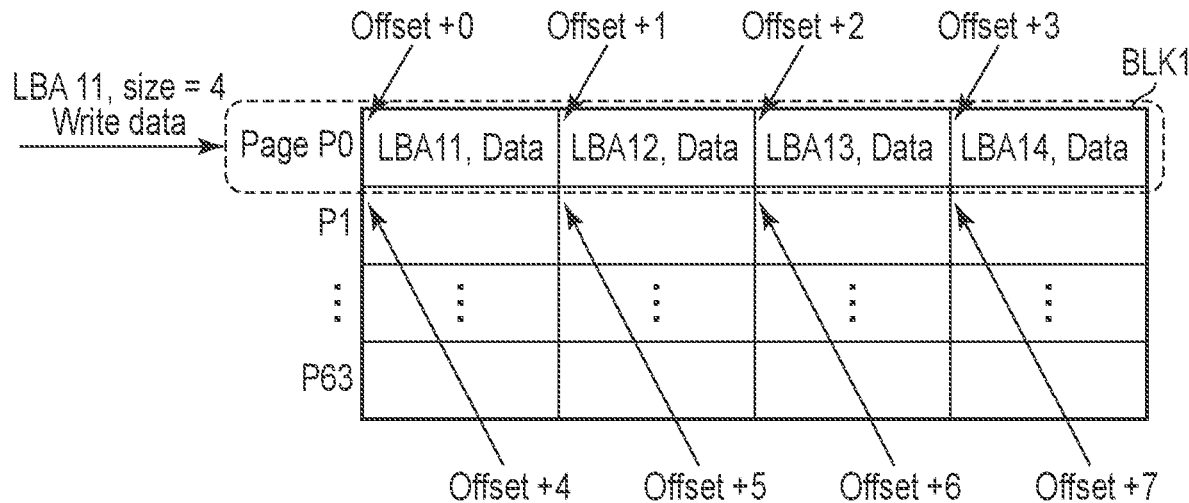
FIG. 11 is a diagram illustrating an example of a data write operation performed in the memory system according to the embodiment when a write request is received from a host.

Next, a data write operation executed in response to a write request from the host 2 will be described. FIG. 11 is a diagram illustrating an example of a data write operation executed in the SSD 3 according to the embodiment when a write request is received from the host 2.

In FIG. 11, a case where a write request specifying the LBA 11 and the size (=4) is received from the host 2 is assumed. The write control unit 121 allocates, for example, the block BLK1 as a write destination block.

The write control unit 121 writes 16 KiB data and four LBAs 11 to 14 associated with the write request to the page P0 in the block BLK1. In this case, the first 4 KiB data among the 16 KiB data and the LBA 11 associated with the write request are written to the first storage location of the page P0 in the block BLK1. The second 4 KiB data among the 16 KiB data and the LBA 12 are written to the second storage location of the page P0 in the block BLK1. The third 4 KiB data among the 16 KiB data and the LBA 13 are written to the third storage location of the page P0 in the block BLK1. The fourth 4 KiB data among the 16 KiB data and the LBA 14 are written to the fourth storage location of the page P0 in the block BLK1.

Figure 12:
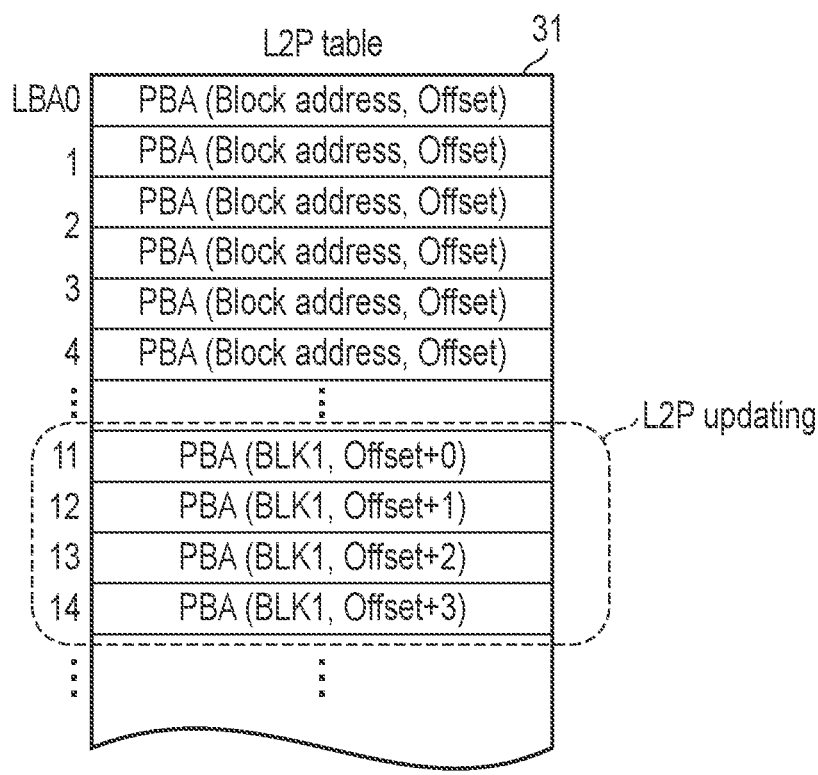
FIG. 12 is a diagram illustrating an operation of updating a logical-to-physical address translation table performed according to the data write operation illustrated in FIG. 11.

FIG. 12 is a diagram illustrating an operation of updating the L2P table 31 executed according to the data write operation illustrated in FIG. 11.

The write control unit 121 updates the L2P table 31 so that four physical addresses PBA storing four pieces of 4 KiB data corresponding to the four LBAs 11 to 14 are associated with the four LBAs 11 to 14, respectively.

In this case, the physical address PBA (BLK1, offset+0) corresponding to the LBA 11 is stored in the entry in the L2P table 31 corresponding to the LBA 11. The physical address PBA (BLK1, offset+0) indicates the first storage location of the page P0 in the block BLK1, that is, the storage location where the 4 KiB data corresponding to the LBA 11 is written.

The physical address PBA (BLK1, offset+1) corresponding to the LBA 12 is stored in the entry in the L2P table 31 corresponding to the LBA 12. The physical address PBA (BLK1, offset+1) indicates the second storage location of the page P0 in the block BLK1, that is, the storage location where the 4 KiB data corresponding to the LBA 12 is written.

The physical address PBA (BLK1, offset+2) corresponding to the LBA 13 is stored in the entry in the L2P table 31 corresponding to the LBA 13. The physical address PBA (BLK1, offset+2) indicates the third storage location of the page P0 in the block BLK1, that is, the storage location where the 4 KiB data corresponding to the LBA 13 is written.

The physical address PBA (BLK1, offset+3) corresponding to the LBA 14 is stored in the entry in the L2P table 31 corresponding to the LBA 14. The physical address PBA (BLK1, offset+3) indicates the fourth storage location of the page P0 in the block BLK1, that is, the storage location where the 4 KiB data corresponding to the LBA 14 is written.

Figure 13:
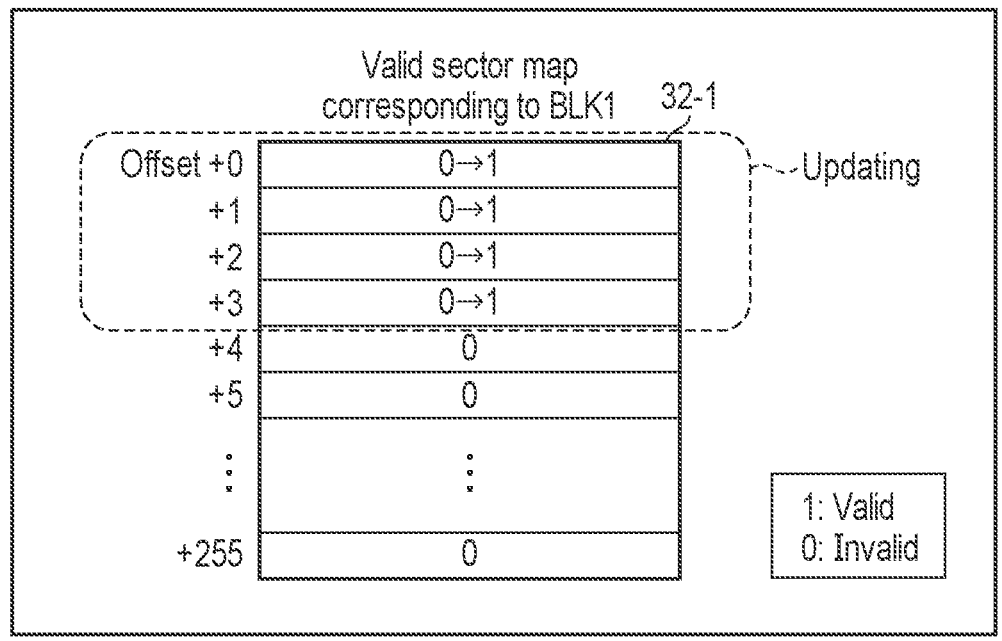
FIG. 13 is a diagram illustrating an operation of updating the valid sector map performed according to the data write operation illustrated in FIG. 11.

FIG. 13 is a diagram illustrating an operation of updating the valid sector map executed according to the data write operation illustrated in FIG. 11.

The write control unit 121 first selects the valid sector map 32-1 corresponding to the block BLK1. The four valid data identifiers from the head in the valid sector map 32-1 correspond to the respective four storage locations in the page P0 of the block BLK1. The write control unit 121 updates each of these four valid data identifiers from the value "0" indicating invalidity to the value "1" indicating validity. As a result, the four pieces of 4 KiB data stored at the four storage locations in the page P0 of the block BLK1 become valid data.

Figure 14:
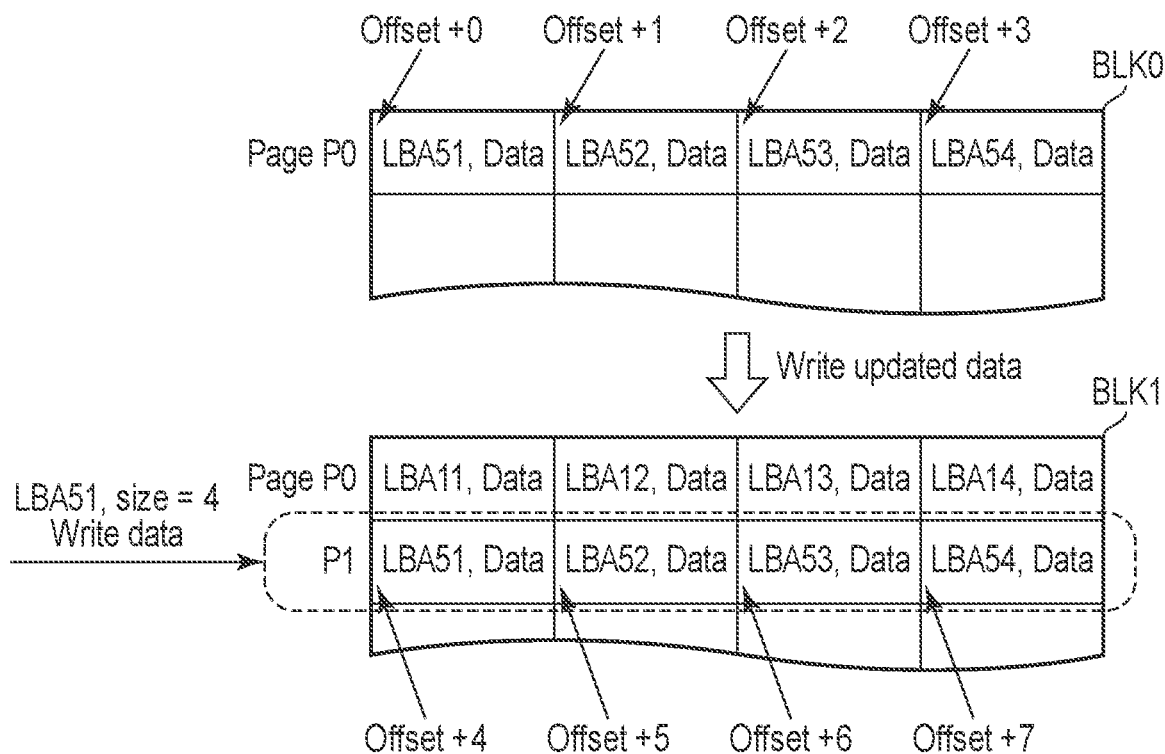
FIG. 14 is a diagram illustrating an example of an operation of writing update data performed in the memory system according to the embodiment.

Next, an operation of writing update data executed in response to a write request from the host 2 will be described. FIG. 14 is a diagram illustrating an example of an update data write operation executed in the SSD 3 according to the embodiment when a write request is received from the host 2.

In FIG. 14, a case where a write request specifying the LBA 51 and size=4 is received from the host 2 in a state where 16 KiB data whose start LBA is LBA 51 is stored in a storage location corresponding to offsets+0 to +3 of the block BLK0 is assumed.

The currently allocated write destination block is the block BLK1. In the page P0 of the block BLK1, four pieces of 4 KiB data corresponding to the four LBAs 11 to 14 have already been written. Therefore, the write control unit 121 writes 16 KiB data and four LBAs 51 to 54 associated with the write request to the page P1 of the block BLK1.

In this case, the first 4 KiB data among the 16 KiB update data and the LBA 51 associated with the write request are written to the first storage location of the page P1 in the block BLK1. The second 4 KiB data among the 16 KiB update data and the LBA 52 are written to the second storage location of the page P1 in the block BLK1. The third 4 KiB data among the 16 KiB update data and the LBA 53 are written to the third storage location of the page P1 in the block BLK1. The fourth 4 KiB data among the 16 KiB update data and the LBA 54 are written to the fourth storage location of the page P1 in the block BLK1.

Figure 15:
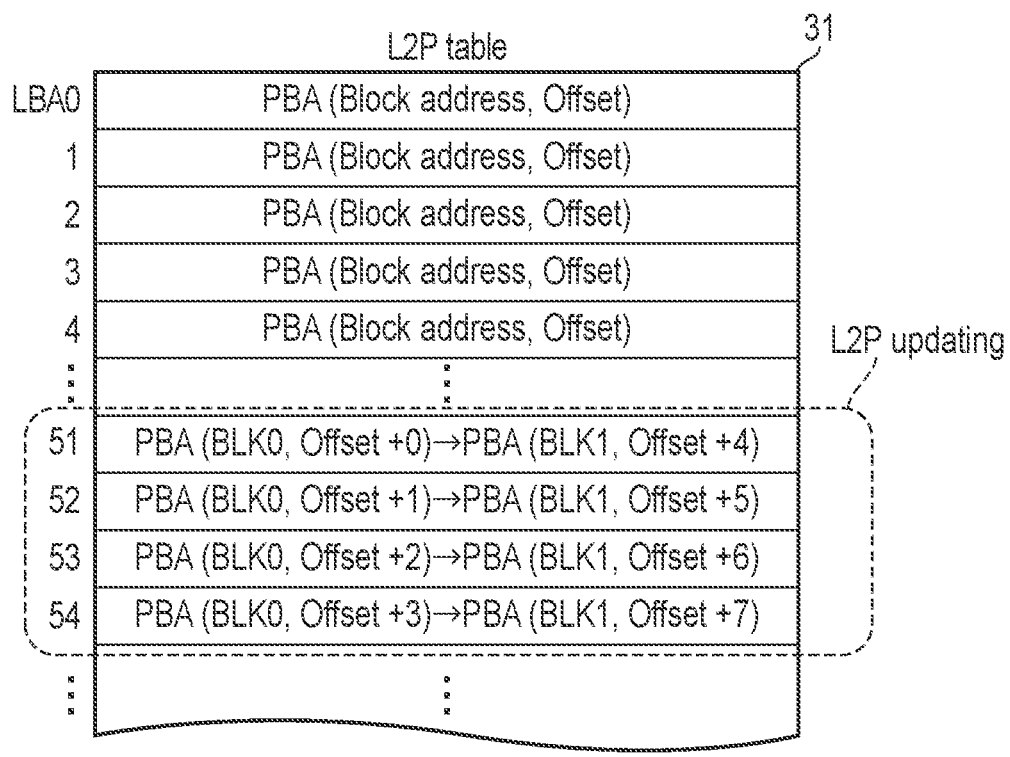
FIG. 15 is a diagram illustrating an operation of updating the logical-to-physical address translation table performed according to the update data write operation illustrated in FIG. 14.

FIG. 15 is a diagram illustrating an operation of updating the L2P table 31 executed according to the update data write operation illustrated in FIG. 14.

The write control unit 121 updates the L2P table 31 so that four physical addresses PBAs indicating four storage locations where four pieces of 4 KiB data corresponding to the four LBAs 51 to 54 are stored are associated with the four LBAs 51 to 54, respectively.

That is, the physical address PBA stored in the entry in the L2P table 31 corresponding to the LBA 51 is updated from the physical address PBA (BLK0, offset+0) to the physical address PBA (BLK1, offset+4). The physical address PBA (BLK0, offset+0) indicates the first storage location of the page P0 in the block BLK0, that is, the storage location where previous 4 KiB data corresponding to the LBA 51 is stored. The physical address PBA (BLK1, offset+4) indicates the first storage location of the page P1 in the block BLK1, that is, the storage location where the 4 KiB update data corresponding to the LBA 51 is written.

The physical address PBA stored in the entry in the L2P table 31 corresponding to the LBA 52 is updated from the physical address PBA (BLK0, offset+1) to the physical address PBA (BLK1, offset+5). The physical address PBA (BLK0, offset+1) indicates the second storage location of the page P0 in the block BLK0, that is, the storage location where the previous 4 KiB data corresponding to the LBA 52 is stored. The physical address PBA (BLK1, offset+5) indicates the second storage location of the page P1 in the block BLK1, that is, the storage location where the 4 KiB update data corresponding to the LBA 52 is written.

Similarly, the physical address PBA stored in the entry in the L2P table 31 corresponding to the LBA 53 is updated from the physical address PBA (BLK0, offset+2) to the physical address PBA (BLK1, offset+6). Further, the physical address PBA stored in the entry in the L2P table 31 corresponding to the LBA 54 is updated from the physical address PBA (BLK0, offset+4) to the physical address PBA (BLK1, offset+7).

FIG. 16 is a diagram illustrating an operation of updating the valid sector map executed according to the update data write operation illustrated in FIG. 14.

First, the write control unit 121 selects the valid sector map 32-0 corresponding to the block BLK0. The four valid data identifiers from the head in the valid sector map 32-0 correspond to the four storage locations in the page P0 of the block BLK0, respectively. The write control unit 121 updates each of these four valid data identifiers from the value "1" indicating validity to the value "0" indicating invalidity.

Next, the write control unit 121 selects the valid sector map 32-1 corresponding to the block BLK1. The fifth to eighth four valid data identifiers in the valid sector map 32-1 correspond to the respective four storage locations in the page P1 of the block BLK1. The write control unit 121 updates each of these four valid data identifiers from the value "0" indicating invalidity to the value "1" indicating validity.

Figure 17:
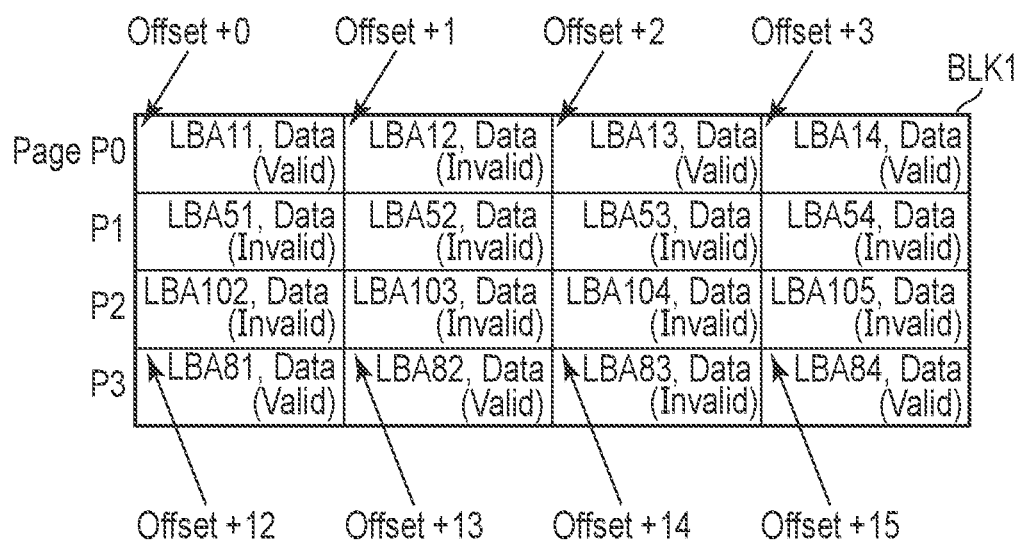
FIG. 17 is a diagram illustrating a state in which data is written at each unwritten storage location in the block where the update data is written.

FIG. 17 is a diagram illustrating a state in which data is written to each unwritten storage location in the block BLK1.

FIG. 17 illustrates a case where the total number of pages included in the block BLK1 is 4 pages, that is, a case where the total number of storage locations (sectors) included in the block BLK1 is 16. Four pieces of 4 KiB data corresponding to the LBAs 102 to 105 are stored at four storage locations in the page P2 of the block BLK1. Four pieces of 4 KiB data corresponding to the LBAs 81 to 84 are stored at four storage locations in the page P3 of the block BLK1.

Here, it is assumed that, among the 16 pieces of 4 KiB data included in the block BLK1, for example, only 4 KiB data corresponding to the LBA 11, 4 KiB data corresponding to the LBA 13, 4 KiB data corresponding to the LBA 14, 4 KiB data corresponding to the LBA 81, 4 KiB data corresponding to the LBA 82, and 4 KiB data corresponding to the LBA 84 are valid data.

Next, a data structure of the valid sector map 32 will be described. FIG. 18 is a diagram illustrating an example of the data placement in the block BLK1 illustrated in FIG. 17 and a data structure of the valid sector map 32-1 corresponding to the block BLK1 illustrated in FIG. 17.

When the total number of storage locations (sectors) included in the block BLK1 is 16, the valid sector map 32-1 corresponding to the block BLK1 includes 16 valid data identifiers corresponding to 16 respective storage locations in the block BLK1, that is, a 16 bit bitmap flag.

When only the 4 KiB data corresponding to the LBA 11, the 4 KiB data corresponding to the LBA 13, the 4 KiB data corresponding to the LBA 14, the 4 KiB data corresponding to the LBA 81, the 4 KiB data corresponding to the LBA 82, and the 4 KiB data corresponding to the LBA 84 are valid data, the 16 valid data identifiers, that is, the 16 bit bitmap flag indicates "1011000000001101".

Next, the invalidation process will be described. FIG. 19 is a diagram illustrating an invalidation process executed in the SSD 3 according to the embodiment when an invalidation request (Trim command) specifying a certain logical address is received from the host 2.

In FIG. 19, a case where a Trim command specifying the LBA 13 and the size=2 is received from the host 2 is assumed.

First, the invalidation process unit 124 refers to the L2P table 31 to acquire the physical address PBA (BLK1, offset+2) corresponding to the LBA 13 and the physical address PBA (BLK1, offset+3) corresponding to the LBA 14 from the L2P table 31. In this case, the invalidation process unit 124 does not change physical address PBA (BLK1, offset+2) to the magic number. The physical address PBA (BLK1, offset+2) is maintained in an entry in the L2P table 31 corresponding to the LBA 13. Similarly, the invalidation processing unit 124 does not change physical address PBA (BLK1, offset+3) to the magic number. The physical address PBA (BLK1, offset+3) is maintained in an entry in the L2P table 31 corresponding to the LBA 14.

The physical address PBA (BLK1, offset+2) indicates the third storage location from the head in the block BLK1. Therefore, the invalidation process unit 124 updates the third valid data identifier from the head of the valid sector map 32-1 corresponding to the block BLK1 from the value "1" indicating validity to the value "0" indicating invalidity.

The physical address PBA (BLK1, offset+3) indicates the fourth storage location from the head in the block BLK1. Therefore, the invalidation process unit 124 updates the fourth valid data identifier from the head of the valid sector map 32-1 corresponding to the block BLK1 from the value "1" indicating validity to the value "0" indicating invalidity.

As a result, the data corresponding to the LBA 13 and the data corresponding to the LBA 14 become invalid data. However, the physical address PBA (BLK1, offset+2) and the physical address PBA (BLK1, offset+3) are maintained in the L2P table 31. Therefore, while the data corresponding to the LBA 13 and the data corresponding to the LBA 14 are present in the block BLK1, the data corresponding to the LBA 13 and the data corresponding to the LBA 14 can be normally read from the NAND flash memory 5 according to the read request from the host 2.

FIG. 20 is a diagram illustrating a data read operation executed in the SSD 3 according to the embodiment. In FIG. 20, a case where reading of data corresponding to the LBA 13 that has already been invalidated by the Trim command is requested is assumed.

When a read request (read command) specifying the LBA 13 and the size=1 is received from the host 2, the read control unit 122 refers to the L2P table 31 to acquire the physical address PBA (BLK1, offset+2) associated with the LBA 13 from the L2P table 31.

The physical address PBA (BLK1, offset+2) indicates the third storage location in the page P0 of the block BLK1. Therefore, the read control unit 122 reads the 4 KiB data stored at the third storage location in the page P0 of the block BLK1 and the LBA (here, the LBA 13) corresponding to the 4 KiB data from the block BLK1.

In this case, for example, the read control unit 122 may four pieces of 4 KiB data and four LBAs corresponding to the four pieces of 4 KiB data from the page P0 of the block BLK1. Then, the read control unit 122 may extract the 4 KiB data stored at the third storage location in the page P0 of the block BLK1 and the LBA (here, the LBA 13) corresponding to this 4 KiB data from the four pieces of 4 KiB data read and the four LBAs read.

The LBA comparison process unit 125 compares the read LBA (here, the LBA 13) corresponding to the read 4 KiB data with the LBA (here, the LBA 13) specified by the read request. When the LBA comparison process unit 125 confirms that these LBAs match with each other, the read control unit 122 transmits the read 4 KiB data to the host 2.

Next, the re-validation process will be described. FIG. 21 is a diagram illustrating a re-validation process executed in the SSD 3 according to the embodiment when a re-validation request (Untrim command) for re-validating data corresponding to a logical address specified by an invalidation request (Trim command) is received from the host 2.

In FIG. 21, a case where an Untrim command specifying the LBA 13 and the size=2 is received from the host 2 is assumed.

First, the re-validation process unit 126 refers to the L2P table 31 to acquire the physical address PBA (BLK1, offset+2) corresponding to the LBA 13 and the physical address PBA (BLK1, offset+3) corresponding to the LBA 14 from the L2P table 31.

The physical address PBA (BLK1, offset+2) indicates the third storage location from the head in the block BLK1. Therefore, the re-validation process unit 126 updates the third valid data identifier from the head of the valid sector map 32-1 corresponding to the block BLK1 from the value "0" indicating invalidity to the value "1" indicating validity. In the L2P table 31, the physical address PBA (BLK1, offset+2) is maintained in the entry corresponding to the LBA 13. Therefore, it is not necessary to store the physical address PBA (BLK1, offset+2) again in the entry corresponding to the LBA 13.

The physical address PBA (BLK1, offset+3) indicates the fourth storage location from the head in the block BLK1. Therefore, the re-validation process unit 126 updates the fourth valid data identifier from the head of the valid sector map 32-1 corresponding to the block BLK1 from the value "0" indicating invalidity to the value "1" indicating validity. In the L2P table 31, the physical address PBA (BLK1, offset+3) is maintained in the entry corresponding to the LBA 14. Therefore, it is not necessary to store the physical address PBA (BLK1, offset+3) again in the entry corresponding to the LBA 14.

Next, the transition of the contents of the valid sector map 32 will be described. FIG. 22 is a diagram illustrating the data placement in a certain block, a valid sector map corresponding to the block, a content of the valid sector map after the invalidation request is processed, and a content of the valid sector map after the re-validation request is processed.

In FIG. 22, the valid sector map 32-1 corresponding to the block BLK1 is illustrated. For example, it is assumed that, among the 16 pieces of 4 KiB data included in the block BLK1, only 4 KiB data corresponding to the LBA 11, 4 KiB data corresponding to the LBA 13, 4 KiB data corresponding to the LBA 14, 4 KiB data corresponding to the LBA 81, 4 KiB data corresponding to the LBA 82, and 4 KiB data corresponding to the LBA 84 are valid data.

In this case, the 16 valid data identifiers included in the valid sector map 32-1, that is, the 16 bit bitmap flag indicates "1011000000001101".

When the Trim command specifying the LBA 13 and the size=2 is received from the host 2, the valid data identifier corresponding to the third storage location in the block BLK1 storing the data corresponding to the LBA 13 is updated from "1" to "0". Further, the valid data identifier corresponding to the fourth storage location in the block BLK1 in which the data corresponding to the LBA 14 is stored is also updated from "1" to "0". As a result, the 16 valid data identifiers included in the valid sector map 32-1 indicate "1000000000001101".

When the block BLK1 is selected as a copy source block for garbage collection, only data stored in four storage locations associated with a valid data identifier of "1" among the 16 storage locations in the block BLK1 is copied to the copy destination block as valid data.

When the Untrim command specifying the LBA 13 and the size=2 is received from the host 2, the valid data identifier corresponding to the third storage location in the block BLK1 storing the data corresponding to the LBA 13 is updated from "0" to "1". Further, the valid data identifier corresponding to the fourth storage location in the block BLK1 in which the data corresponding to the LBA 14 is stored is also updated from "0" to "1". As a result, the 16 valid data identifiers included in the valid sector map 32-1 indicate "1011000000001101".

When the block BLK1 is reused as the write destination block after the garbage collection operation is performed on the block BLK1, there is a possibility that data corresponding to another LBA different from the LBA 13 is newly written to the third storage location in the block BLK1. Similarly, there is a possibility that data corresponding to another LBA different from the LBA 14 is newly written to the fourth storage location in the block BLK1.

In this case, the LBA read from the third storage location in the block BLK1 does not match the LBA 13. Therefore, when the Untrim command specifying the LBA 13 is received, the process of updating the valid data identifier corresponding to the third storage location in the block BLK1 from "0" to "1" is not executed. Similarly, since the LBA read from the fourth storage location in the block BLK1 does not match the LBA 14, the process of updating the valid data identifier corresponding to the fourth storage location in the block BLK1 from "0" to "1" is not executed.

Figure 23:
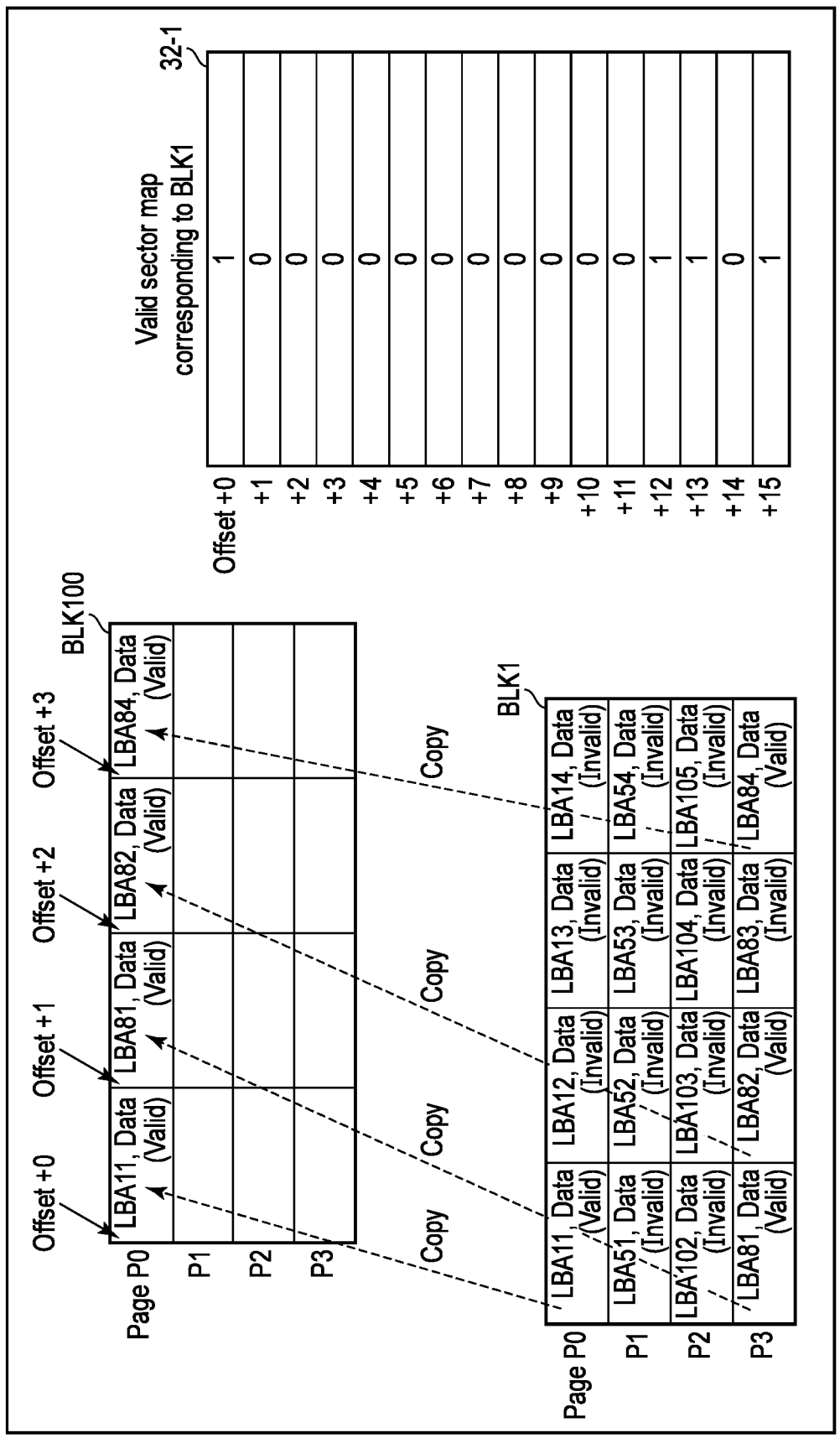
FIG. 23 is a diagram illustrating a garbage collection operation of copying both valid data and a logical address from a copy source block to a copy destination block based on a valid sector map corresponding to a copy source block.

Next, the garbage collection operation will be described. FIG. 23 is a diagram illustrating a garbage collection operation of copying both valid data and a logical address from a copy source block to a copy destination block based on the valid sector map 32 corresponding to the copy source block.

The GC control unit 123 selects a copy source block from the active blocks. In addition, the GC control unit 123 selects a copy destination block from among the free blocks. FIG. 23 illustrates a case where the block BLK1 is selected as the copy source block after the data corresponding to the LBAs 13 to 14 is invalidated by the Trim command described in FIG. 19. In FIG. 23, the block BLK100 is a block selected as a copy destination block.

The GC control unit 123 selects the valid sector map 32-1 corresponding to the copy source block BLK1. The valid sector map 32-1 indicates "1000000000001101". The GC control unit 123 copies only the valid data and the LBA corresponding to the valid data from the copy source block BLK1 to the copy destination block BLK100 based on the valid sector map 32-1.

In the copy source block BLK1, one piece of 4 KiB data stored in the first storage location in the page P0 of the copy source block BLK1 and three pieces of 4 KiB data stored in the first, second, and fourth storage locations in the copy source block BLK1 page P3 are valid data. Therefore, the four pieces of 4 KiB data in the copy source block BLK1 and the four LBAs (LBA 11, LBA 81, LBA 82, LBA 84) corresponding to the four pieces of 4 KiB data are read from the copy source block BLK1. The four pieces of 4 KiB data read and four LBAs (LBA 11, LBA 81, LBA 82, LBA 84) read are written to four copy destination storage locations in the page P0 of the copy destination block BLK100, respectively.

Figure 24:
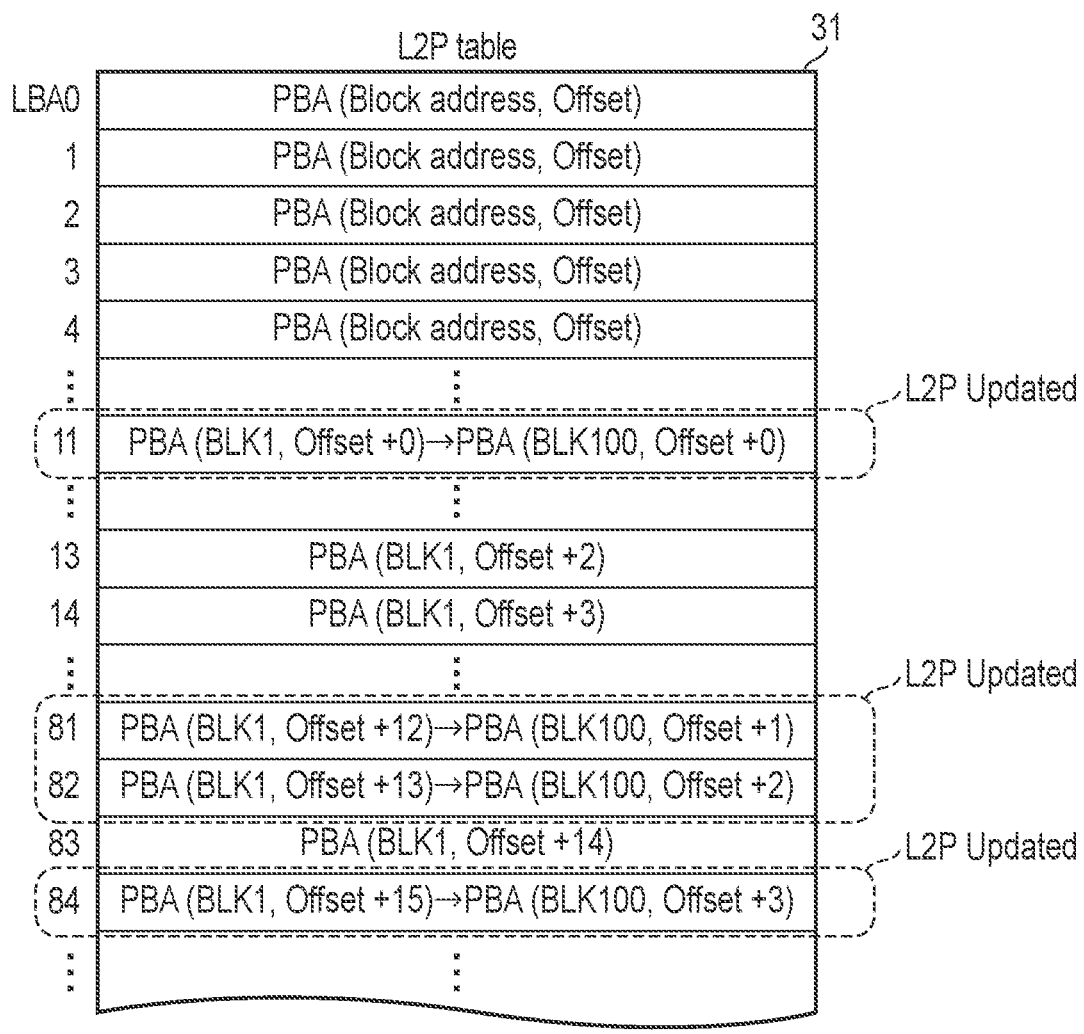
FIG. 24 is a diagram illustrating an operation of updating a logical-to-physical address translation table performed in the garbage collection operation illustrated in FIG. 23.

FIG. 24 is a diagram illustrating an operation of updating the L2P table 31 executed in the garbage collection operation illustrated in FIG. 23.

The GC control unit 123 updates the L2P table 31 so that the four physical addresses PBA indicating the four copy destination storage locations are associated with the LBA 11, the LBA 81, the LBA 82, and the LBA 84 corresponding to the four copied 4 KiB data.

That is, the physical address PBA stored in the entry in the L2P table 31 corresponding to the LBA 11 is updated from the physical address PBA (BLK1, offset+0) to the physical address PBA (BLK100, offset+0). The physical address PBA (BLK100, offset+0) indicates the first storage location of the page P0 in the block BLK100, that is, the storage location to which the 4 KiB data corresponding to the LBA 11 is copied.

The physical address PBA stored in the entry in the L2P table 31 corresponding to the LBA 81 is updated from the physical address PBA (BLK1, offset+12) to the physical address PBA (BLK100, offset+1). The physical address PBA (BLK100, offset+1) indicates the second storage location of the page P0 in the block BLK100, that is, the storage location to which the 4 KiB data corresponding to the LBA 81 is copied.

Similarly, the physical address PBA stored in the entry in the L2P table 31 corresponding to the LBA 82 is updated from the physical address PBA (BLK1, offset+13) to the physical address PBA (BLK100, offset+2). In addition, the physical address PBA stored in the entry in the L2P table 31 corresponding to the LBA 84 is updated from the physical address PBA (BLK1, offset+15) to the physical address PBA (BLK100, offset+3).

FIG. 25 is a diagram illustrating an operation of updating the valid sector map corresponding to the copy source block and an operation of updating the valid sector map corresponding to the copy destination block executed in the garbage collection operation illustrated in FIG. 23.

First, the GC control unit 123 selects the valid sector map 32-1 corresponding to the copy source block BLK1. The first valid data identifier in the valid sector map 32-1 corresponds to the head storage location (copy source storage location) of the block BLK1 in which the copied valid data (data corresponding to the LBA 11) is stored. The GC control unit 123 updates the valid data identifier from the value "1" indicating validity to the value "0" indicating invalidity.

The thirteenth valid data identifier from the head of the valid sector map 32-1 corresponds to the thirteenth storage location (copy source storage location) from the head of the block BLK1 in which the copied valid data (data corresponding to the LBA 81) is stored. The GC control unit 123 updates the valid data identifier from the value "1" indicating validity to the value "0" indicating invalidity.

Similarly, the GC control unit 123 updates each of the fourteenth and sixteenth valid data identifiers from the head of the valid sector map 32-1 from the value "1" indicating validity to the value "0" indicating invalidity.

Next, the GC control unit 123 selects the valid sector map 32-100 corresponding to the copy destination block BLK100. The four valid data identifiers from the head in the valid sector map 32-100 correspond to the four storage locations (copy destination storage locations) in the page P0 of the copy destination block BLK100, respectively. The GC control unit 123 updates each of these four valid data identifiers from the value "0" indicating invalidity to the value "1" indicating validity.

Figure 26:
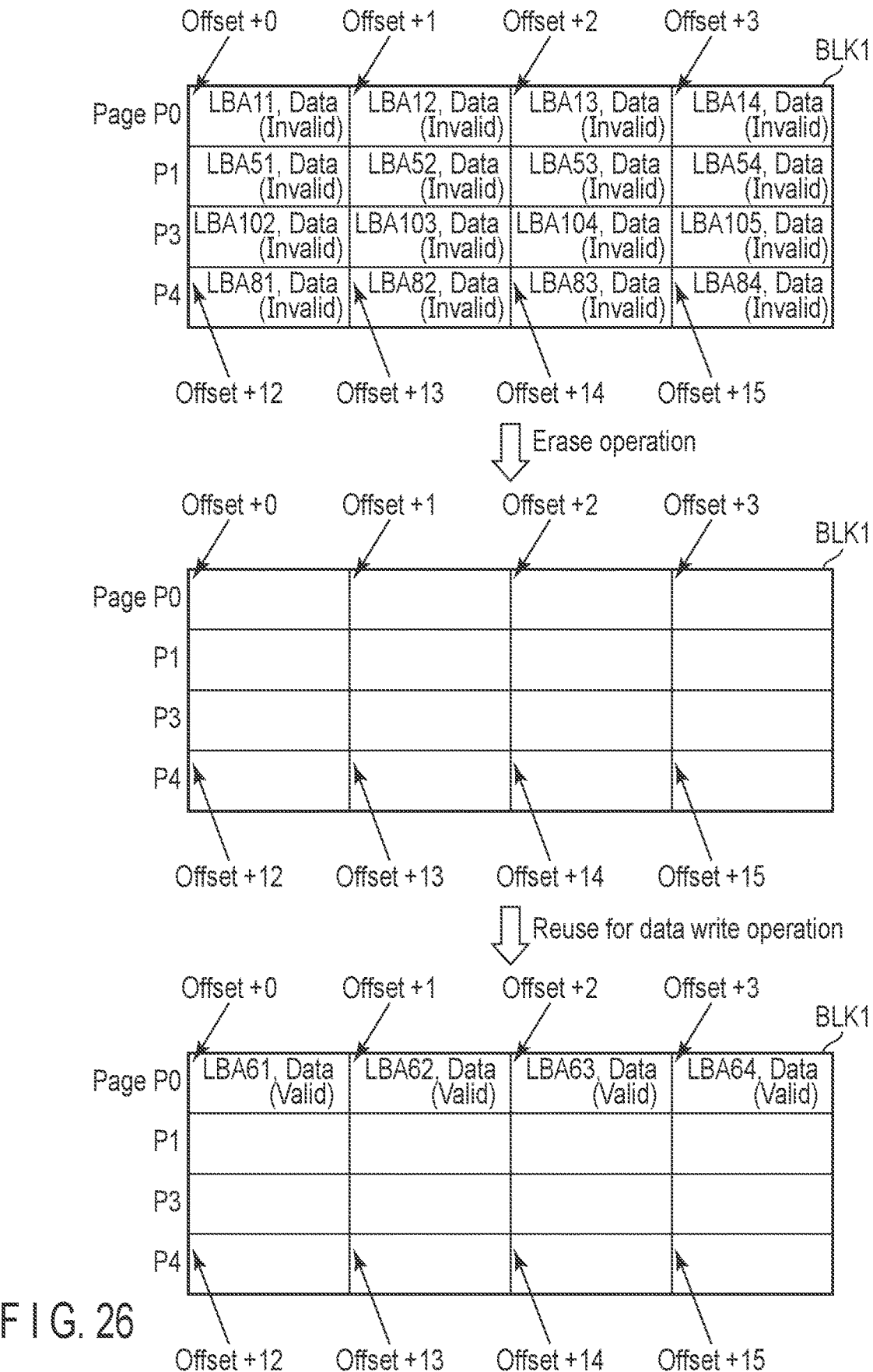
FIG. 26 is a diagram illustrating an operation of reusing a copy source block for writing data after copying of all valid data and all logical addresses in the copy source block is completed.

Next, an operation of reusing the copy source block performed to the garbage collection operation for data writing will be described. FIG. 26 is a diagram illustrating an operation of reusing a copy source block for writing data after copying of all valid data and all logical addresses in the copy source block is completed.

When the operation of copying the four pieces of valid data in the copy source block BLK1 and the four LBAs corresponding to the four pieces of valid data to the copy destination block is completed, the copy source block BLK1 will be a free block not including valid data. Therefore, the block BLK1 can be reused as a new write destination block.

When the block BLK1 is reused as a new write destination block, the erase operation on the block BLK1 is first performed. As a result, all the data in the block BLK1 is erased from the block BLK1. Then, the data and the LBA corresponding to the data are written to the block BLK1.

For example, when a write request specifying the LBA 61 and the size (=4) is received from the host 2, the write control unit 121 writes the 16 KiB data and the four LBAs 61 to 64 associated with the write request to the page P0 in the block BLK1. In this case, the first 4 KiB data among the 16 KiB data associated with the write request and the LBA 61 are written to the first storage location of the page P0 in the block BLK1. The second 4 KiB data among the 16 KiB data and the LBA 62 are written to the second storage location of the page P0 in the block BLK1. The third 4 KiB data among the 16 KiB data and the LBA 63 are written to the third storage location of the page P0 in the block BLK1. The fourth 4 KiB data among the 16 KiB data and the LBA 64 are written to the fourth storage location of the page P0 in the block BLK1.

Then, the write control unit 121 updates the L2P table 31 to associate four physical addresses indicating the four storage locations where the four pieces of 4 KiB data are written with the four LBAs 61 to 64, respectively.

FIG. 27 is a diagram illustrating an operation executed when the logical address read together with the data from the storage location corresponding to the physical address PBA acquired from the L2P table 31 does not match the logical address specified by the read request.

In FIG. 27, a case where, after the block BLK1 is reused as the write destination block, reading of data corresponding to the LBA 13 that has already been invalidated by the Trim command is requested is assumed.

When a read request (read command) specifying the LBA 13 and the size=1 is received from the host 2, the read control unit 122 refers to the L2P table 31 to acquire the physical address PBA (BLK1, offset+2) associated with the LBA 13 from the L2P table 31.

The physical address PBA (BLK1, offset+2) indicates the third storage location in the page P0 of the block BLK1.

Therefore, the read control unit 122 reads the 4 KiB data stored at the third storage location in the page P0 of the block BLK1 and the LBA corresponding to the 4 KiB data from the block BLK1.

The LBA 63 and the 4 KiB data corresponding to the LBA 63 are stored at the third storage location in the page P0 of the block BLK1.

The LBA comparison process unit 125 compares the read LBA (here, the LBA 63) corresponding to the 4 KiB data read from the block BLK1 with the LBA (here, the LBA 13) specified by the read request. When the LBA comparison process unit 125 confirms that these LBAs do not match each other, the read control unit 122 does not transmit the read 4 KiB data to the host 2.

In this case, the read control unit 122 may notify the host 2 that the host 2 has requested data that does not exist in the SSD 3. As a method of notifying the host 2 that the host 2 has requested data that does not exist in the SSD 3, a method of transmitting an error code indicating that the host 2 has requested data that does not exist in the SSD 3 to the host 2, a method of transmitting data having a predetermined specific data pattern to the host 2, or the like can be used.

Figure 28:
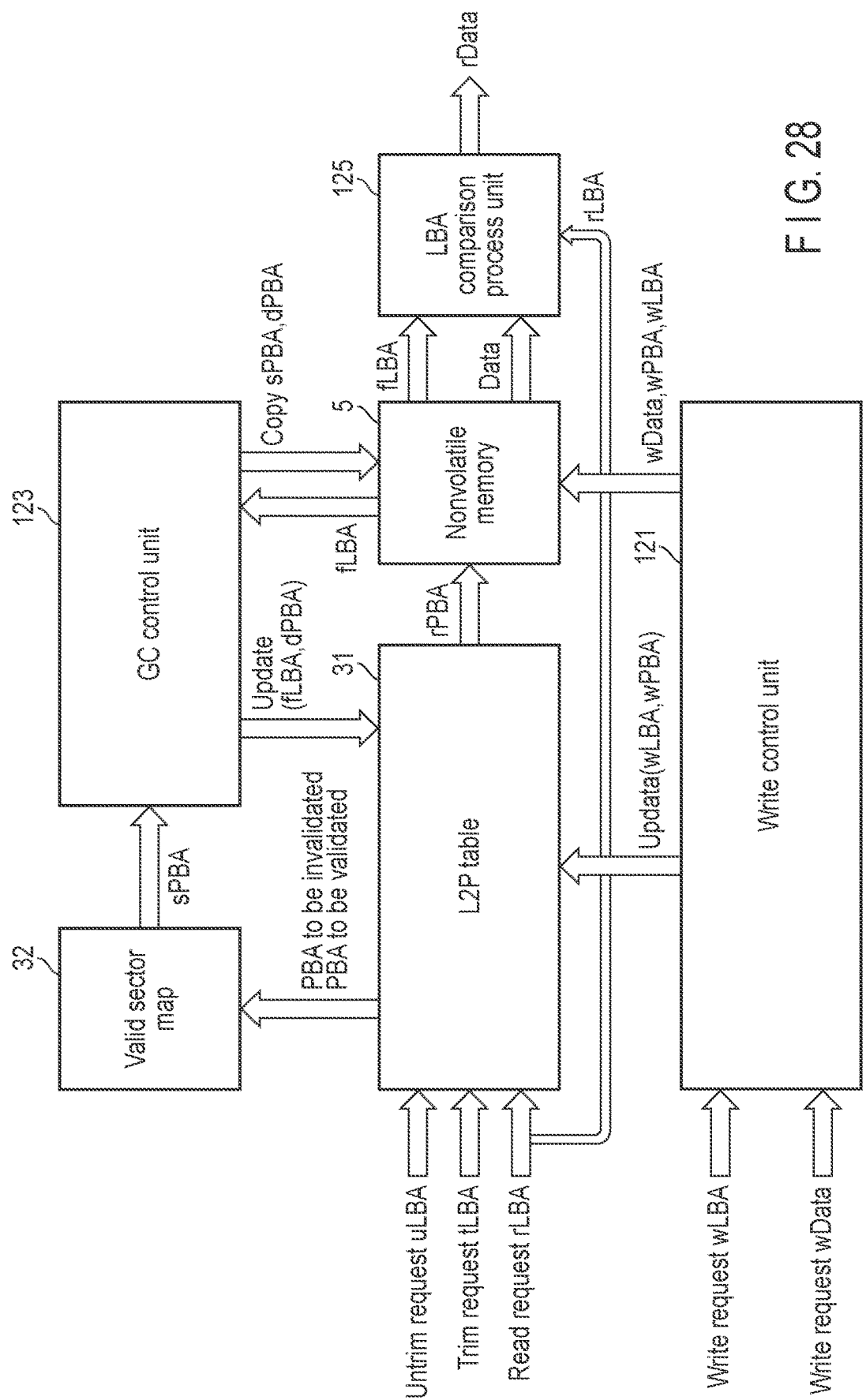
FIG. 28 is a diagram illustrating sequences of a data write operation, a garbage collection operation, an invalidation process, a sequence of a re-validation process, and a data read operation, which are performed in the memory system according to the embodiment.

Next, a data write operation, a garbage collection operation, an invalidation process, a re-validation process, and a data read operation will be described. FIG. 28 is a diagram illustrating a sequence of the data write operation, a sequence of the garbage collection operation, a sequence of the invalidation process, a sequence of the re-validation process, and a sequence of the data read operation executed in the SSD 3 according to the embodiment.

In FIG. 28, a wLBA and wData indicate the LBA and the data associated with the write request. The wPBA indicates a physical address PEA to which data is to be written. The fLBA indicates an LBA together with data written to the NAND flash memory 5.

The rLBA and the rData indicate an LBA associated with the read request and data read in response to the read request. The rPBA indicates a physical address PBA from which data is to be read.

The sPBA indicates a physical address PBA of the copy source storage location used as a GC source. The dPBA indicates the physical address PBA of the copy destination storage location used as a GC destination.

The tLBA indicates an LBA specified by the Trim command (Trim request). The uLBA indicates an LBA specified by the Untrim command (Untrim request).

When a write request is received from the host 2, the write control unit 121 determines the physical address wPBA to which the data wData associated with the received write request is to be written. Then, the write control unit 121 writes wData and a wLBA to the storage location in the NAND flash memory 5 indicated by the physical address wPBA.

Further, the write control unit 121 associates the wPBA with the wLBA by storing the wPBA in an entry in the L2P table 31 corresponding to the wLBA. The valid data identifier in the valid sector map 32 corresponding to the wPBA to which the wData is written is updated to "1".

The GC control unit 123 identifies a physical address sPBA of each copy source storage location in the copy source block storing valid data based on the valid sector map 32. The GC control unit 123 reads the valid data and the fLBA of the valid data from the identified physical address sPBA. Then, the GC control unit 123 copies the read valid data and the read fLBA to the copy destination storage location in the copy destination block indicated by the dPBA.

The GC control unit 123 updates the L2P table 31 so that the dPBA is associated with the read fLBA. The valid data identifier in the valid sector map 32 corresponding to the dPBA to which the valid data is copied is updated to "1". In addition, the valid data identifier in the valid sector map 32 corresponding to the sPBA in which the valid data is stored is updated to "0".

When the Trim request specifying the tLBA is received from the host 2, the PBA associated with the tLBA is acquired from the L2P table 31. The valid data identifier in the valid sector map 32 corresponding to this acquired PBA is updated to "0".

When the Untrim request specifying the uLBA is received from the host 2, the PBA associated with the tLBA is acquired from the L2P table 31. The valid data identifier in the valid sector map 32 corresponding to this acquired PBA is updated to "1".

When the read request specifying the rLBA is received from the host 2, the rPBA associated with the tLBA is acquired from the L2P table 31. Then, both the data and the fLBA corresponding to this data are read from the storage location indicated by the rPBA from the NAND flash memory 5. The LBA comparison process unit 125 compares the fLBA together with the data read from the NAND flash memory 5 with the rLBA specified by the read request. When the fLBA matches the rLBA, data read from the NAND flash memory 5 is transmitted as the rDATA to the host 2. When the fLBA does not match the rLBA, the data read from the NAND flash memory 5 is not transmitted to the host 2.

Figure 29:
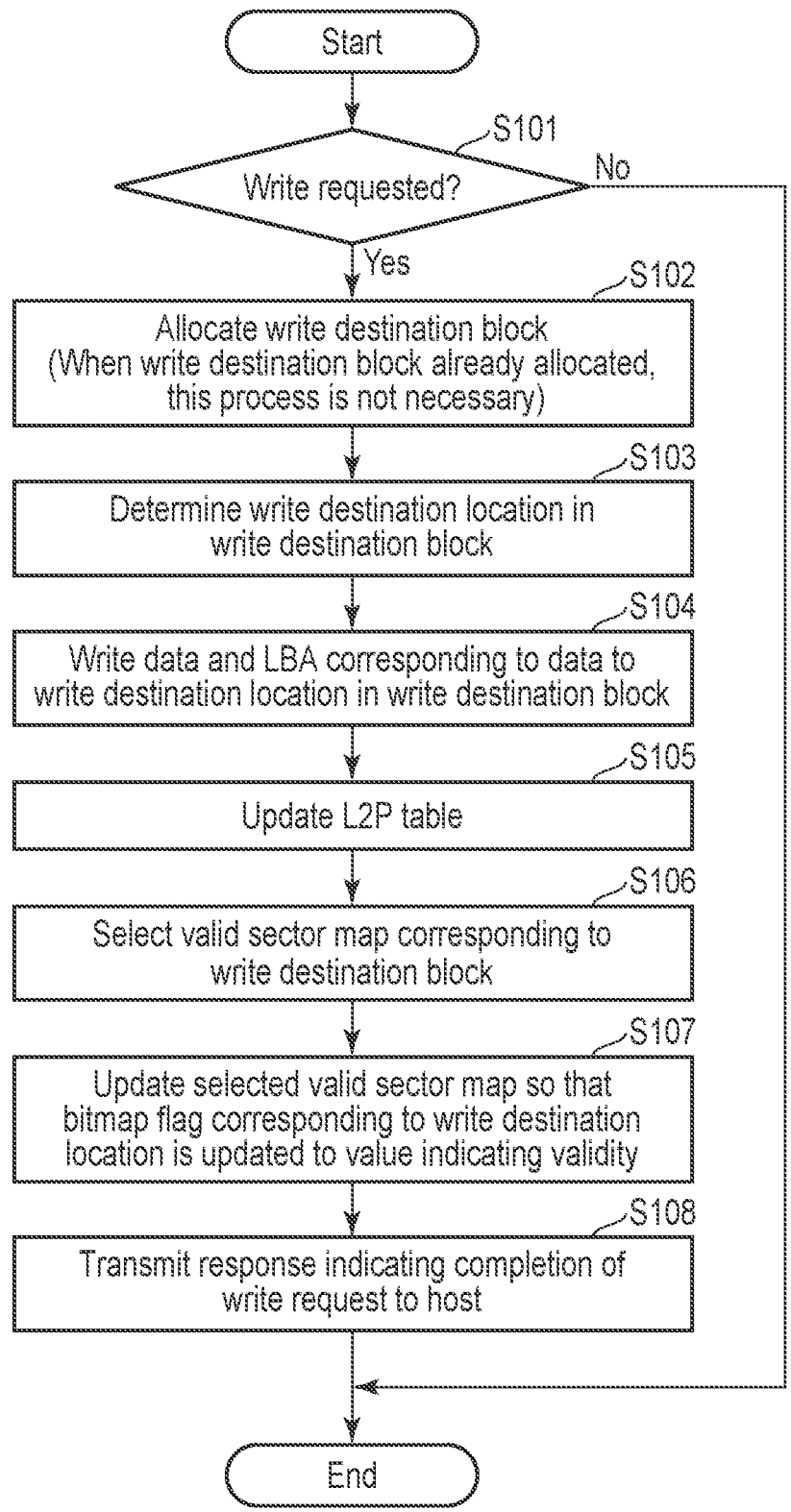
FIG. 29 is a flowchart illustrating a procedure of a data write operation performed in the memory system according to the embodiment.

Next, a procedure of the data write operation will be described. FIG. 29 is a flowchart illustrating a procedure of the data write operation executed in the SSD 3 according to the embodiment.

When a write request is received from the host 2 (Yes in step S101), the controller 4 allocates one of a plurality of blocks in the NAND flash memory 5 as a write destination block (step S102). When the write destination block has already been allocated, it is not necessary to execute the process of step S102.

The controller 4 determines a storage location (write destination location) in the write destination block where the write data associated with the received write request is to be written (step S103). The controller 4 writes both the write data and the LBA corresponding to the write data to the write destination location in the write destination block (step S104).

The controller 4 updates the L2P table 31 so that the physical address PBA indicating the write destination location is associated with the LBA (Step 105). The controller 4 selects a valid sector map corresponding to the write destination block (step S106). The controller 4 updates the selected valid sector map so that a valid data identifier (bitmap flag) in the valid sector map corresponding to the write destination location in the write destination block is updated to a value indicating validity (step S107).

Then, the controller 4 transmits a response indicating completion of the write request to the host (step S108).

Figure 30:
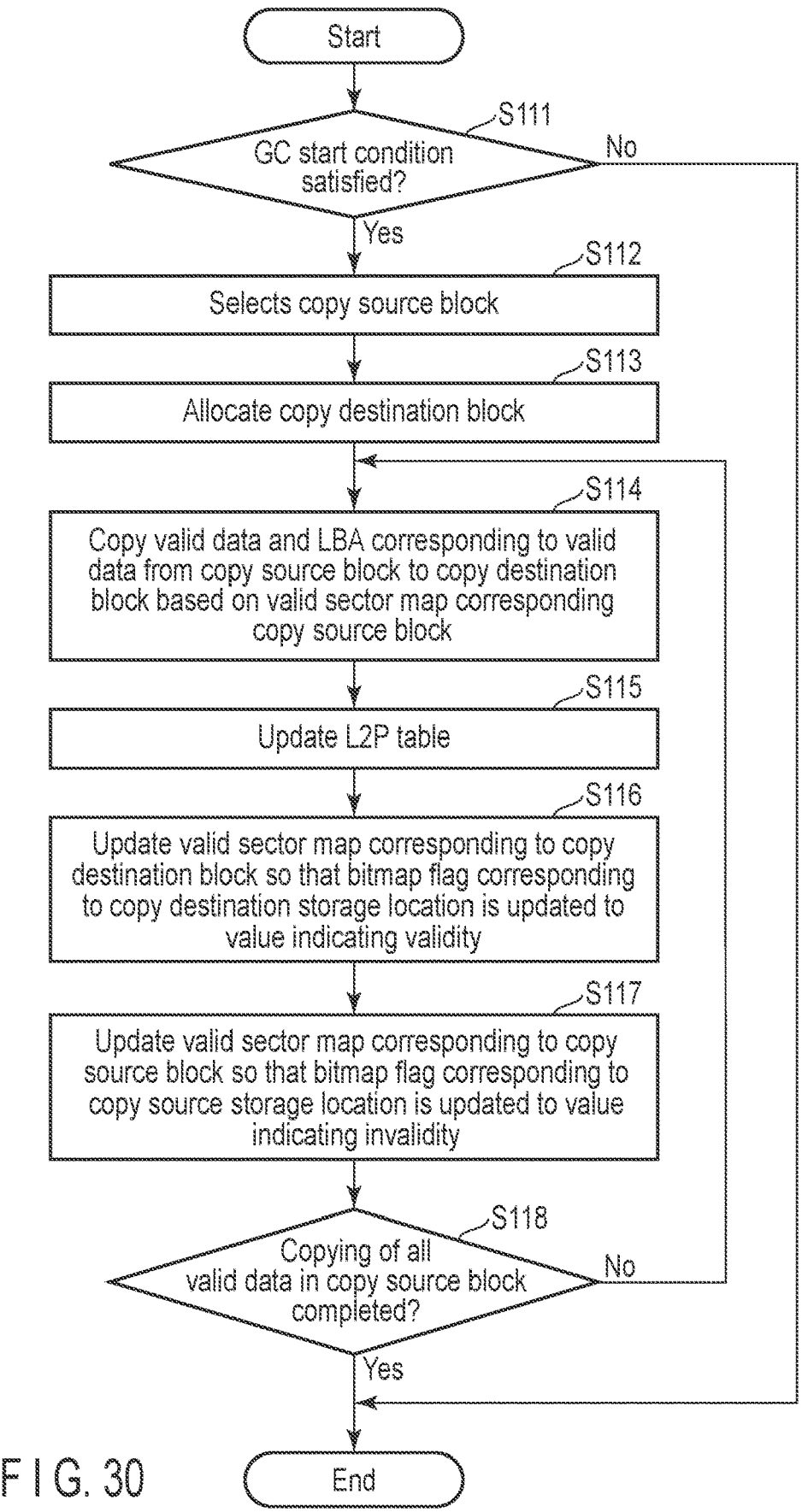
FIG. 30 is a flowchart illustrating a procedure of a garbage collection operation performed in the memory system according to the embodiment.

Next, a procedure of the garbage collection operation will be described. FIG. 30 is a flowchart illustrating a procedure of the garbage collection operation executed in the SSD 3 according to the embodiment.

The controller 4 determines whether a GC start condition is satisfied (step S111). For example, when the number of remaining free blocks reaches a threshold value, it may be determined that the GC start condition is satisfied.

When the GC start condition is satisfied (Yes in step S111), the controller 4 selects a copy source block from the active blocks (step S112). The controller 4 allocates a copy destination block (step S113).

Based on a plurality of valid data flags in the valid sector map corresponding to a plurality of respective storage locations included in the copy source block, the controller 4 copies valid data and an LBA corresponding to the valid data from the copy source block to the copy destination block (step S114). The controller 4 updates the L2P table 31 so that the physical address PBA indicating the copy destination storage location in the copy destination block to which the valid data is copied is associated with the LBA of the valid data (step S115).

The controller 4 selects a valid sector map corresponding to the copy destination block. The controller 4 updates the selected valid sector map so that the valid data identifier (bitmap flag) in the valid sector map corresponding to the copy destination storage location in the copy destination block to which the valid data is copied is updated to a value indicating validity (step S116).

The controller 4 selects a valid sector map corresponding to the copy source block. The controller 4 updates the selected valid sector map so that the valid data identifier (bitmap flag) in the valid sector map corresponding to the copy source storage location in the copy source block storing the copied valid data is updated to a value indicating invalidity (step S117).

The controller 4 determines whether copying of all valid data in the copy source block has been completed (step S118). The process of steps S114 to S117 is repeatedly executed until the process of copying all valid data in the copy source block from the copy source block to the copy destination block is completed.

Figure 31:
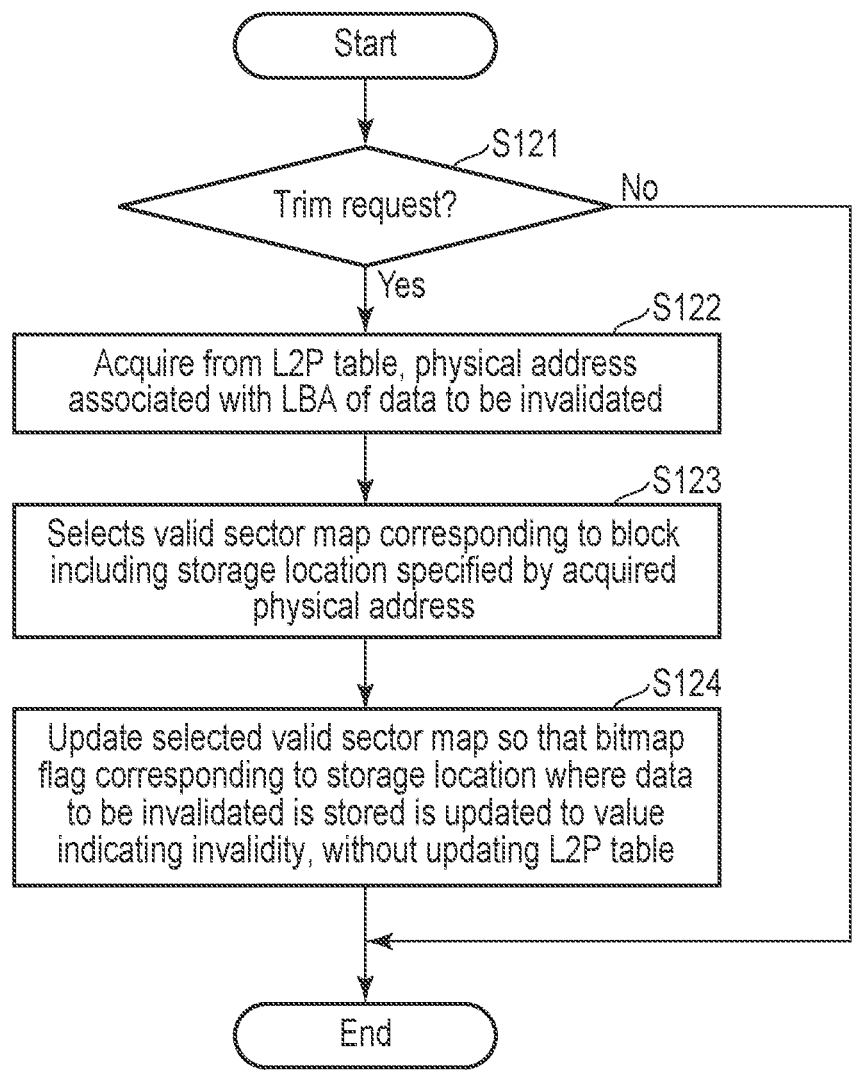
FIG. 31 is a flowchart illustrating a procedure of an invalidation process performed in the memory system according to the embodiment.

Next, a procedure of the invalidation process will be described. FIG. 31 is a flowchart illustrating a procedure of the invalidation process executed in the SSD 3 according to the embodiment.

When receiving a Trim request specifying a LBA of data to be invalidated from the host 2 (Yes in step S121), the controller 4 refers to the L2P table 31 to acquire the physical address PBA associated with the LBA specified by the received Trim request from the L2P table 31 (step S122).

The controller 4 selects the valid sector map corresponding to the block including the storage location specified by the acquired physical address PBA (step S123).

The controller 4 updates the selected valid sector map while maintaining the acquired physical address PBA in the L2P table 31 without updating the L2P table 31 (step S124). In step S124, the controller 4 updates the selected valid sector map so that the valid data identifier corresponding to the storage location indicated by the acquired physical address PBA is updated to a value indicating invalidity.

Figure 32:
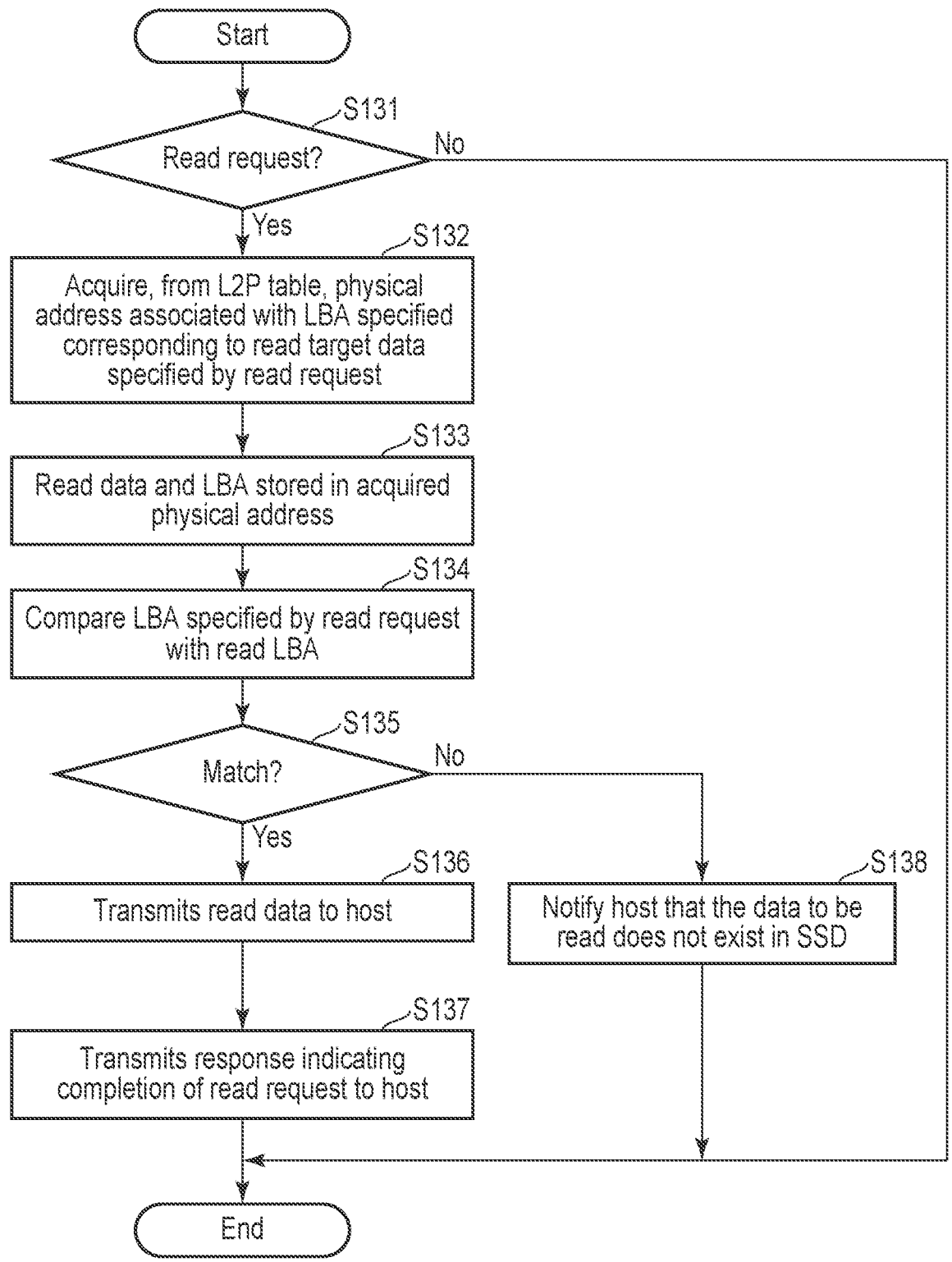
FIG. 32 is a flowchart illustrating a procedure of a data read operation performed in the memory system according to the embodiment.

Next, a procedure of the data read operation will be described. FIG. 32 is a flowchart illustrating a procedure of the data read operation executed in the SSD 3 according to the embodiment.

When a read request specifying the LBA of the data to be read is received from the host 2 (Yes in step S131), the controller 4 refers to the L2P table 31 to acquire the physical address PBA associated with the LBA specified by the received read request from the L2P table 31 (step S132).

The controller 4 reads the data and the LBA from the storage location in the NAND flash memory 5 indicated by the acquired physical address PBA (step S133). The controller 4 compares the LBA specified by the received read request with the read LBA (step S134).

When the read LBA matches the LBA specified by the received read request (Yes in step S135), the controller 4 transmits the read data to the host 2 (step S136). Then, the controller 4 transmits a response indicating completion of the read request to the host 2 (step S137).

When the read LBA does not match the LBA specified by the received read request (No in step S135), the controller 4 notifies the host 2 that the data to be read corresponding to the LBA specified by the read request does not exist in the SSD 3 (step S138). In step S138, the read data is not transmitted to the host 2.

Figure 33:
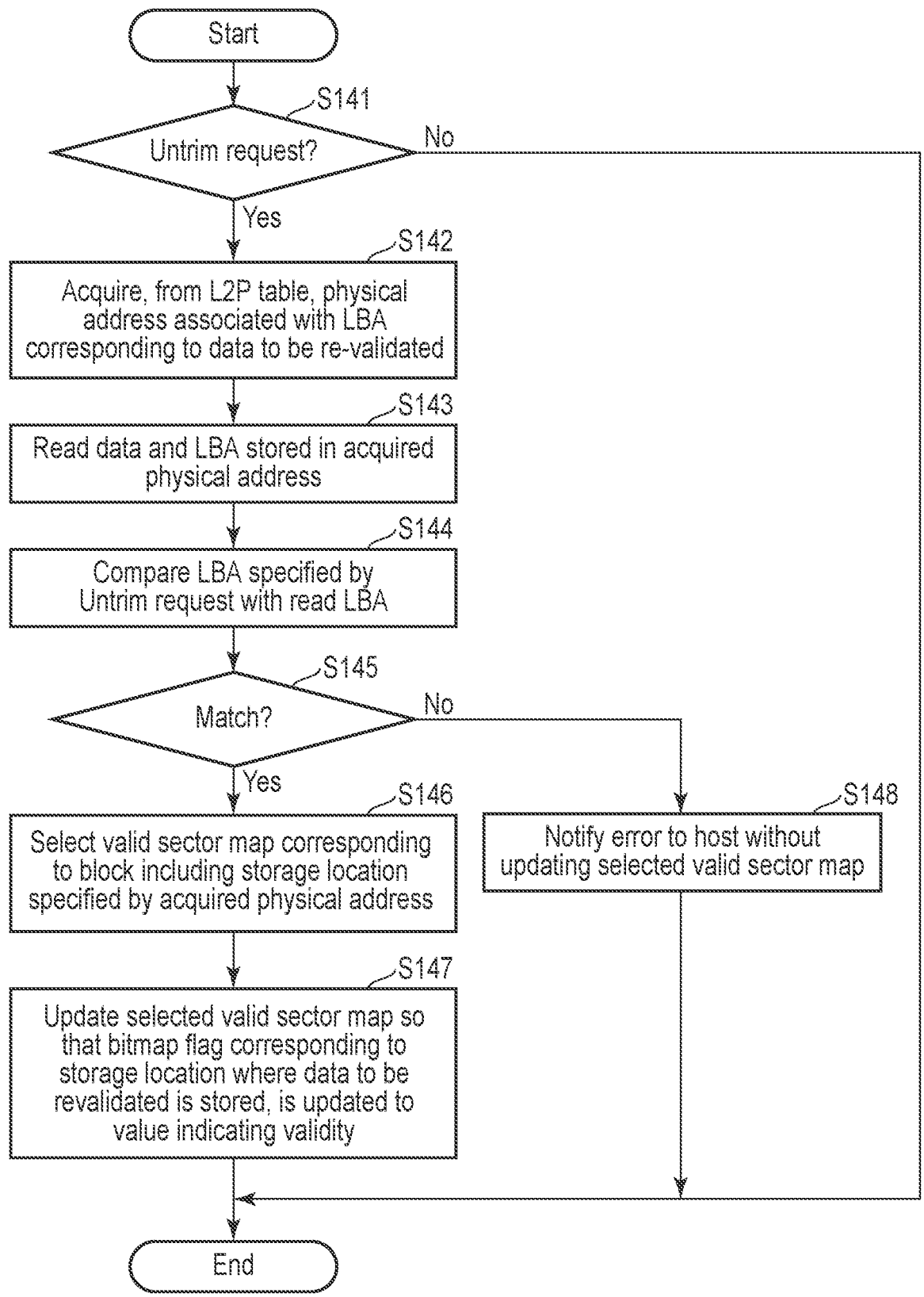
FIG. 33 is a flowchart illustrating a procedure of a re-validation process performed in the memory system according to the embodiment.

Next, the re-validation process will be described. FIG. 33 is a flowchart illustrating a procedure of the re-validation process executed in the SSD 3 according to the embodiment.

When an Untrim request specifying an LBA corresponding to data to be re-validated is received from the host 2 (Yes in step S141), the controller 4 refers to the L2P table 31 to acquire the physical address PBA associated with the LBA specified by the received Untrim request from the L2P table 31 (step S142).

The controller 4 reads the data and the LBA from the storage location in the NAND flash memory 5 indicated by the acquired physical address PBA (step S143). The controller 4 compares the LBA specified by the received Untrim request with the read LBA (step S144).

When the read LBA matches the LBA specified by the received Untrim request (Yes in step S145), the controller 4 selects the valid sector map corresponding to the block including the storage location indicated by the acquired physical address PBA (step S146).

The controller 4 updates the selected valid sector map so that the valid data identifier (bitmap flag) corresponding to the storage location indicated by the acquired physical address PBA is updated to a value indicating validity (step S147).

When the read LBA does not match the LBA specified by the received Untrim request (No in step S145), the controller 4 transmits an error to the host 2 without updating the selected valid sector map (step S148).

As described above, according to the present embodiment, in the data write operation, both the data and the LBA are written to the block. Therefore, in the garbage collection operation, the controller 4 can easily identify the LBA corresponding to the valid data copied from the copy source block to the copy destination block from the LBA stored together with the data in the copy source block. As a result, the controller 4 can easily associate the physical address indicating the copy destination storage location in the copy destination block to which the valid data is copied with the LBA corresponding to the copied valid data. The copy source block performed to the garbage collection operation can be reused as a write destination block.

When the invalidation request (Trim command) is received from the host 2, the controller 4 refers to the L2P table 31 to acquire a physical address indicating a storage location where data corresponding to the LBA specified by the invalidation request is stored from the L2P table 31. Then, while maintaining the acquired physical address in the L2P table 31, the controller 4 updates the valid data identifier in the valid sector map 32 corresponding to the storage location indicated by the acquired physical address to a value indicating invalidity.

As a result, the data stored in the storage location indicated by the acquired physical address is treated as invalid data. Therefore, in a case where the block including the storage location is selected as the copy source block for garbage collection, the data stored in the storage location can be excluded from the data to be copied, whereby the write amplification can be reduced.

In the L2P table 31, the physical address corresponding to the LBA specified by the invalidation request remains without being deleted. Therefore, even when the host 2 erroneously issues an invalidation request specifying a certain LBA, the physical address corresponding to the LBA specified by the invalidation request can be acquired from the L2P table 31.

Therefore, even when the invalidation request specifying a certain LBA is issued by the host 2, the data corresponding to this LBA can be read from the block before the garbage collection operation is performed on the block storing the data corresponding to this LBA and the block is reused as a new write destination block.

Therefore, the invalidation process of updating only the valid sector map 32 without updating the L2P table 31 can enable reading of data corresponding to the LBA specified by the invalidation request for a certain period of time while realizing an effect corresponding to the original purpose of the invalidation request of reducing the write amplification.

In addition, as described above, since the physical address corresponding to the LBA specified by the invalidation request remains in the L2P table 31, there is no need to execute an additional process of storing the physical address corresponding to the specified LBA in another memory region.

Therefore, it is possible to implement an invalidation process that can cope with a case where the host 2 erroneously issues an invalidation request without increasing necessary memory resources.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
a nonvolatile memory including a plurality of blocks; and
a controller configured to manage a plurality of valid data identifiers corresponding to a plurality of storage locations included in each of the plurality of blocks, block by block, using a management table, each of the plurality of valid data identifiers indicating validity or invalidity of data stored in a corresponding storage location, wherein the controller is further configured to:
in response to receiving from the host a write request specifying a first logical address, write both first data associated with the write request and the first logical address to a first block, update a logical-to-physical address translation table such that a first physical address indicating a first storage location in the first block where the first data is written is associated with the first logical address, and update a first valid data identifier in the management table corresponding to the first storage location in the first block to a value indicating validity;
in response to receiving from the host an invalidation request for invalidating the first data corresponding to the first logical address, acquire, from the logical-tophysical address translation table, the first physical address associated with the first logical address, and update the first valid data identifier in the management table corresponding to the first storage location in the first block indicated by the acquired first physical address to a value indicating invalidity;

when executing garbage collection for the nonvolatile memory, select a copy source block for the garbage collection from the plurality of blocks, copy both valid data and a logical address corresponding to the valid data from the copy source block to a copy destination block, based on a plurality of second valid data identifiers in the management table corresponding to a plurality of storage locations in the copy source block, update the logical-to-physical address translation table such that a physical address indicating a copy destination storage location in the copy destination block to which the valid data is copied is associated with the logical address of the valid data, update a third valid data identifier in the management table corresponding a copy source storage location in the copy source block where the valid data is stored to a value indicating invalidity, and update a fourth valid data identifier in the management table corresponding to the copy destination storage location in the copy destination block to a value indicating validity;

in response to receiving a re-validation request for re-validating the first data corresponding to the first logical address from the host, the re-validation request specifying the first logical address:

acquire the first physical address associated with the first logical address from the logical-to-physical address translation table;

read, from the first block, based on the acquired first physical address, a logical address that is stored together with data in the first storage location in the first block indicated by the acquired first physical address;

determine whether the read logical address matches the first logical address specified by the re-validation request;

update the first valid data identifier corresponding to the first storage location in the first block indicated by the acquired first physical address to a value indicating validity, when the read logical address matches the first logical address; and notify the host of an error when the read logical address does not match the first logical address.

2. The memory system according to claim 1, wherein the acquired first physical address is maintained in the logical-to-physical address translation table when the first valid data identifier in the management table is updated to the value indicating invalidity.

3. The memory system according to claim 1, wherein the controller is further configured to:

in response to receiving a read request specifying the first logical address from the host, acquire the first physical address associated with the first logical address from the logical-to-physical address translation table, read from the first block both data stored in the first storage location in the first block indicated by the acquired first physical address and a logical address corresponding to the data, transmit the read data to the host when the read logical address matches the first logical address specified by the read request, and does not transmit the read data to the host when the read logical address does not match the first logical address specified by the read request.

4. The memory system according to claim 1, wherein the controller is further configured to:

notify the host of the error without updating the first valid data identifier to the value indicating validity, when the read logical address does not match the first logical address specified by the re-validation request.

5. The memory system according to claim 1, wherein the controller is further configured to:

when the invalidation request is received from the host, update the first valid data identifier to the value indicating invalidity without changing an entry of the logical-to-physical address translation table corresponding to the first logical address from the first physical address to a value indicating an invalidity.

6. A method of controlling a nonvolatile memory including a plurality of blocks, the method comprising:

managing a plurality of valid data identifiers corresponding to a plurality of storage locations included in each of the plurality of blocks, block by block, using a management table, each of the plurality of valid data identifiers indicating validity or invalidity of data stored in a corresponding storage location;

in response to receiving from the host a write request for specifying a first logical address, writing both first data associated with the write request and the first logical address to a first block;

updating a logical-to-physical address translation table such that a first physical address indicating a first storage location in the first block where the first data is written is associated with the first logical address; and updating a first valid data identifier in the management table corresponding to the first storage location in the first block to a value indicating validity;

in response to receiving from the host an invalidation request for invalidating the first data corresponding to the first logical address, acquiring the first physical address associated with the first logical address from the logical-to-physical address translation table; and updating the first valid data identifier in the management table corresponding to the first storage location in the first block indicated by the acquired first physical address to a value indicating invalidity;

when executing garbage collection for the nonvolatile memory, selecting a copy source block for the garbage collection from the plurality of blocks;

copying both valid data and a logical address corresponding to the valid data from the copy source block to a copy destination block, based on a plurality of second valid data identifiers in the management table corresponding to a plurality of storage locations in the copy source block;

updating the logical-to-physical address translation table such that a physical address indicating a copy destination storage location in the copy destination block to which the valid data is copied is associated with the logical address of the valid data;

updating a third valid data identifier in the management table corresponding to a copy source storage location in the copy source block where the valid data is stored to a value indicating invalidity; and updating a fourth valid data identifier in the management table corresponding to the copy destination storage location in the copy destination block to a value indicating validity; and in response to receiving a re-validation request for re-validating the first data corresponding to the first logical address from the host, the re-validation request specifying the first logical address;

acquiring the first physical address associated with the first logical address from the logical-to-physical address translation table;

reading, from the first block, based on the acquired first physical address, a logical address that is stored together with data in the first storage location in the first block indicated by the acquired first physical address;

determining whether the read logical address matches the first logical address specified by the re-validation request;

updating the first valid data identifier corresponding to the first storage location in the first block indicated by the acquired first physical address to a value indicating validity when the read logical address matches the first logical address; and notifying the host of an error when the read logical address does not match the first logical address.

7. The method according to claim 6, wherein
the acquired first physical address is maintained in the logical-to-physical address translation table when the first valid data identifier in the management table is updated to the value indicating invalidity.

8. The method according to claim 6, further comprising:

in response to receiving from the host a read request for specifying the first logical address, acquiring the first physical address associated with the first logical address from the logical-to-physical address translation table;

reading, from the first block, both data stored in the first storage location in the first block indicated by the acquired first physical address and a logical address corresponding to the data;

transmitting the read data to the host when the read logical address matches the first logical address specified by the read request; and not transmitting the read data to the host when the read logical address does not match the first logical address specified by the read request.

9. The method according to claim 6, wherein
the notifying includes notifying the host of the error without updating the first valid data identifier to a value indicating validity, when the read logical address does not match the first logical address specified by the re-validation request.

10. The method according to claim 6, wherein
the updating the first valid data identifier includes updating, when the invalidation request is received from the host, the first valid data identifier to the value indicating invalidity without changing an entry of the logical-to-physical address translation table corresponding to the first logical address from the first physical address to a value indicating an invalidity.

* * * * *